(12) United States Patent
Nietfeld et al.

(10) Patent No.: US 10,874,939 B2
(45) Date of Patent: *Dec. 29, 2020

(54) ELECTRONIC CONTROLLER WITH FINGER MOTION SENSING

(71) Applicant: VALVE CORPORATION, Bellevue, WA (US)

(72) Inventors: Scott Nietfeld, Bellevue, WA (US); Jeffrey George Leinbaugh, Kirkland, WA (US); Eric James Hope, Duvall, WA (US); Philip Bryan, Bellevue, WA (US); Scott Richard Britt, Kirkland, WA (US); Jeffrey Walter Mucha, Sammamish, WA (US); Claire Michelle Gottschalk, Bellevue, WA (US); Jeremy Slocum, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,385

(22) Filed: Jun. 15, 2018

(65) Prior Publication Data
US 2018/0361234 A1    Dec. 20, 2018

Related U.S. Application Data

(60) Provisional application No. 62/520,958, filed on Jun. 16, 2017.

(51) Int. Cl.
*A63F 13/245* (2014.01)
*A63F 13/42* (2014.01)
(Continued)

(52) U.S. Cl.
CPC ............ *A63F 13/245* (2014.09); *A63F 13/21* (2014.09); *A63F 13/213* (2014.09);
(Continued)

(58) Field of Classification Search
None
See application file for complete search history.

(56) References Cited

U.S. PATENT DOCUMENTS

| 4,489,302 A | 12/1984 | Eventoff |
| 4,845,457 A | 7/1989 | Nakanishi |

(Continued)

FOREIGN PATENT DOCUMENTS

| JP | WO2018179180 A1 | 10/2018 |

OTHER PUBLICATIONS

Notification of Transmittal of the International Search Report and the Written Opinion of the International Search Authority, or the Declaration (in English) of Int. App. No. PCT/US18/37952, filed on Jun. 15, 2018, dated Sep. 10, 2018 from ISA/US.

(Continued)

*Primary Examiner* — Seng H Lim
(74) *Attorney, Agent, or Firm* — Lee & Hayes, P.C.

(57) ABSTRACT

A controller includes a body having a handle, and an array of proximity sensors spatially distributed on, in, beneath, or near the outer surface of the handle, responsive to a proximity of a user's fingers to that outer surface. A finger tracker converts the output of the array of proximity sensors to a set of joint angles corresponding to a plurality of the user's fingers. The controller may include a renderer for processing the joint angles to deform a hand mesh that is rendered for display. Values may be calculated to facilitate normalization of the output of the proximity sensor array and thereby generate a set of normalized finger detection data. This data may be processed through curl logic to produce a linear estimate of gross finger curl with respect to the user and thereby generate a set of estimates for a plurality of finger joint angles for the user.

27 Claims, 17 Drawing Sheets

(51) Int. Cl.
*A63F 13/21* (2014.01)
*A63F 13/214* (2014.01)
*A63F 13/213* (2014.01)

(52) U.S. Cl.
CPC ............ *A63F 13/214* (2014.09); *A63F 13/42* (2014.09); *A63F 2300/8082* (2013.01)

(56) References Cited

U.S. PATENT DOCUMENTS

| | | | |
|---|---|---|---|
| 5,184,120 | A | 2/1993 | Schultz |
| 5,302,936 | A | 4/1994 | Yaniger |
| 5,912,612 | A | 6/1999 | DeVolpi |
| 6,285,276 | B1 | 9/2001 | Nedele et al. |
| 6,388,556 | B1 | 5/2002 | Imai et al. |
| 6,829,942 | B2 | 12/2004 | Yanai et al. |
| 7,112,755 | B2 | 9/2006 | Kitano et al. |
| 7,932,892 | B2 | 4/2011 | Chen et al. |
| 8,062,126 | B2 | 11/2011 | Marks et al. |
| 8,274,358 | B2 | 9/2012 | Ando et al. |
| 8,586,882 | B2 | 11/2013 | Tanaka et al. |
| 8,636,199 | B1 | 1/2014 | Slayden et al. |
| 8,816,964 | B2 | 8/2014 | Edwards |
| 9,508,504 | B2 | 11/2016 | Suzuki et al. |
| 9,690,408 | B1 | 6/2017 | Krah |
| 9,696,223 | B2 | 7/2017 | Lisseman et al. |
| 10,307,669 | B2 | 6/2019 | Hope et al. |
| 10,353,506 | B2 | 7/2019 | Vosgueritchian et al. |
| 10,386,224 | B2 | 8/2019 | Shim et al. |
| 10,444,094 | B1 | 10/2019 | Ocampo |
| 2001/0035856 | A1 | 11/2001 | Myers |
| 2002/0010020 | A1 | 1/2002 | Johnson |
| 2002/0175894 | A1 | 11/2002 | Grillo |
| 2003/0043014 | A1 | 3/2003 | Nakazawa et al. |
| 2003/0090465 | A1 | 5/2003 | Dellinger |
| 2004/0012557 | A1 | 1/2004 | Daniel |
| 2005/0172734 | A1* | 8/2005 | Alsio ............... G06F 3/014 73/865.4 |
| 2005/0179644 | A1* | 8/2005 | Alsio ............... G06F 3/014 345/156 |
| 2005/0259069 | A1 | 11/2005 | Baker et al. |
| 2006/0146018 | A1 | 7/2006 | Arneson et al. |
| 2006/0293864 | A1 | 12/2006 | Soss |
| 2007/0078316 | A1 | 4/2007 | Hoarau et al. |
| 2007/0119698 | A1 | 5/2007 | Day |
| 2007/0146349 | A1 | 6/2007 | Errico et al. |
| 2007/0249422 | A1 | 10/2007 | Podoloff |
| 2007/0279380 | A1 | 12/2007 | Murillo |
| 2008/0136778 | A1 | 6/2008 | Hursh |
| 2008/0146336 | A1* | 6/2008 | Feldman ............. A63F 13/02 463/37 |
| 2008/0261693 | A1* | 10/2008 | Zalewski ............ G06F 3/0304 463/31 |
| 2008/0311990 | A1* | 12/2008 | Chiu ................ A63F 13/06 463/37 |
| 2009/0005166 | A1 | 1/2009 | Sato |
| 2009/0143141 | A1 | 6/2009 | Wells et al. |
| 2009/0256817 | A1 | 10/2009 | Perlin et al. |
| 2009/0305786 | A1* | 12/2009 | Chang ............... A63F 13/06 463/37 |
| 2010/0194682 | A1 | 8/2010 | Orr et al. |
| 2010/0245239 | A1 | 9/2010 | Sternberg |
| 2011/0059796 | A1* | 3/2011 | Kondo ............... A63F 13/28 463/31 |
| 2011/0080339 | A1 | 4/2011 | Sun et al. |
| 2011/0084932 | A1 | 4/2011 | Simmons et al. |
| 2011/0159959 | A1* | 6/2011 | Mallinson .......... A63F 13/235 463/37 |
| 2011/0221564 | A1 | 9/2011 | Deppiesse et al. |
| 2012/0088580 | A1* | 4/2012 | Takeda ............... A63F 13/02 463/31 |
| 2012/0143091 | A1 | 6/2012 | Annett et al. |
| 2012/0214594 | A1 | 8/2012 | Kirovski et al. |
| 2013/0027341 | A1 | 1/2013 | Mastandrea |
| 2013/0063342 | A1 | 3/2013 | Chen et al. |
| 2013/0096849 | A1 | 4/2013 | Campbell et al. |
| 2014/0015633 | A1 | 1/2014 | Nakae et al. |
| 2014/0098018 | A1 | 4/2014 | Kim |
| 2014/0240267 | A1 | 8/2014 | Luo |
| 2014/0274397 | A1 | 9/2014 | Sebastian |
| 2014/0313168 | A1 | 10/2014 | Luo |
| 2014/0366650 | A1 | 12/2014 | Thillainadarajah et al. |
| 2015/0084884 | A1 | 3/2015 | Cherradi El Fadili |
| 2015/0091858 | A1 | 4/2015 | Rosenberg et al. |
| 2015/0120777 | A1 | 4/2015 | Ramos |
| 2015/0352437 | A1 | 12/2015 | Koseki et al. |
| 2015/0359457 | A1 | 12/2015 | Blumenthal et al. |
| 2016/0026253 | A1 | 1/2016 | Bradski et al. |
| 2016/0030835 | A1 | 2/2016 | Argiro |
| 2016/0085355 | A1 | 3/2016 | Pirogov et al. |
| 2016/0124500 | A1 | 5/2016 | Lee et al. |
| 2016/0246369 | A1 | 8/2016 | Osman |
| 2016/0259404 | A1* | 9/2016 | Woods ................. G06F 3/0346 |
| 2016/0283008 | A1 | 9/2016 | Perlin et al. |
| 2016/0306932 | A1 | 10/2016 | Fateh et al. |
| 2016/0317267 | A1 | 11/2016 | Meerbeek et al. |
| 2016/0342218 | A1 | 11/2016 | Burba et al. |
| 2016/0356658 | A1 | 12/2016 | Hou et al. |
| 2016/0357261 | A1 | 12/2016 | Bristol et al. |
| 2016/0364002 | A1 | 12/2016 | Gates et al. |
| 2016/0364910 | A1 | 12/2016 | Higgins et al. |
| 2017/0031503 | A1 | 2/2017 | Rosenberg et al. |
| 2017/0135586 | A1 | 5/2017 | Jeon et al. |
| 2017/0139481 | A1 | 5/2017 | Long |
| 2017/0177102 | A1 | 6/2017 | Long |
| 2017/0192506 | A1 | 7/2017 | Andersen et al. |
| 2017/0205903 | A1* | 7/2017 | Miller .................. G06F 3/0346 |
| 2017/0351345 | A1 | 12/2017 | Nirjon et al. |
| 2018/0025531 | A1 | 1/2018 | Terahata |
| 2018/0067545 | A1* | 3/2018 | Provancher ............. G06F 3/011 |
| 2018/0099219 | A1 | 4/2018 | Hope et al. |
| 2018/0161670 | A1 | 6/2018 | Boev |
| 2018/0188816 | A1 | 7/2018 | Liu et al. |
| 2018/0264357 | A1 | 9/2018 | Dalton et al. |
| 2018/0272232 | A1 | 9/2018 | Campbell et al. |
| 2019/0009172 | A1 | 1/2019 | Sawai et al. |
| 2019/0076716 | A1 | 3/2019 | Chiou et al. |
| 2019/0102927 | A1 | 4/2019 | Yokokawa |
| 2019/0232160 | A1 | 8/2019 | Hope et al. |
| 2019/0308110 | A1 | 10/2019 | Muramatsu et al. |
| 2019/0325651 | A1 | 10/2019 | Bradner et al. |
| 2019/0344173 | A1 | 11/2019 | Mucha et al. |
| 2020/0218377 | A1 | 7/2020 | Dalton et al. |
| 2020/0246691 | A1 | 8/2020 | Petersen et al. |

OTHER PUBLICATIONS

Brown et al, "5 improvements we're excited to see from Valve's 'Knuckles' controllers", retrieved on Jan. 20, 2019 at <<https://www.vrheads.com/5-Improvements-were-exclted-see-valves-knuckles-controllers>>, VR Heads, Jul. 11, 2017., 6 pages.

Non Final Office Action dated Jan. 8, 2019 for U.S. Appl. No. 15/679,521 "Electronic Controller With Hand Retainer and Finger Motion Sensing" Mucha, 11 pages.

Non Final Office Action dated Jan. 8, 2019 for U.S. Appl. No. 15/834,425 "Electronic Controller with a Hand Retainer, outer shell, and finger sensing" Hope, 11 pages.

Non Final Office Action dated Jan. 18, 2019 for U.S. Appl. No. 15/834,425 "Electronic Controller with a Hand Retainer, outer shell, and finger sensing" Hope, 20 pages.

PCT Search Report and Written Opinion dated Feb. 6, 2019 for PCT Application No. PCT/US2018/064116, 8 pages.

PCT Search Report and Written Opinion dated Feb. 8, 2019 for PCT Application No. PCT/US2018/064120, 11 pages.

Freescale Semiconductor, Inc. "Touch Sensors", 2009, <<https://www.freescale.com/touch>>, 2 pages.

Invitation to Pay Fees dated Aug. 6, 2019 for Application PCT/US2019/32982 "Sensor Fusion Algorithms for a Handheld Controller That Includes a Force Sensing Resistor (FSR)", 2 pages.

Non Final Office Action dated Jul. 23, 2019 for U.S. Appl. No. 15/984,245 "Sensor Fusion Algorithms for a Handheld Controller That Includes a Force Sensing Resistor (FSR)" Dalton, 18 pages.

(56) References Cited

OTHER PUBLICATIONS

Final Office Action dated Jul. 29, 2019 for U.S. Appl. No. 15/834,425 "Electronic Controller with a Hand Retainer, outer shell, and finger sensing" Hope, 23 pages.
Non Final Office Action dated Sep. 18, 2019 for U.S. Appl. No. 16/289,420 "Sensor Fusion Algorithms for a Handheld Controller That Includes a Force Sensing Resistor (FSR)" Leinbaugh, 13 pages.
Non Final Office Action dated Sep. 19, 2019 for U.S. Appl. No. 15/984,231 "Force Sensing Resistor (FSR) With Polyimide Substrate, Systems, and Methods Thereof" Campbell, 35 pages.
PCT Search Report and Written Opinion dated Jul. 24, 2019 for PCT Application No. PCT/US19/32928, 4 pages.
PCT Search Report and Written Opinion dated Oct. 8, 2019 for PCT Application No. PCT/US19/32982, 11 pages.
PCT Search Report and Written Opinion dated Aug. 15, 2019 for PCT Application No. PCT/US2019/032968, 12 pages.
PCT Search Report and Written Opinion dated Sep. 10, 2019 for PCT Application No. PCT/US2019/037794, 10 pages.
PCT Search Report and Written Opinion dated Sep. 17, 2019 for PCT Application No. PCT/US2019/037802, 7 pages.
Non Final Office Action dated Mar. 18, 2020 for U.S. Appl. No. 15/984,231 "Force Sensing Resistor (FSR) With Polyimide Substrate, Systems, and Methods Thereof", Campbell, 12 pages.
Non Final Office Action dated Jun. 12, 2020 for U.S. Appl. No. 16/392,497, "Electronic Controller With Finger Sensing and an Adjustable Hand Retainer", Petersen, 13 pages.
Non Final Office Action dated Jun. 18, 2020 for U.S. Appl. No. 16/377,058, "Electronic Controller With Finger Sensing and an Adjustable Hand Retainer", Hope, 18 pages.
Non Final Office Action dated Jun. 22, 2020 for U.S. Appl. No. 16/195,718, "Virtual Reality Hand Gesture Generation", Nietfeld, 26 pages.
Non Final Office Action dated Jul. 20, 2020 for U.S. Appl. No. 16/389,499, "Holding and Releasing Virtual Objects", Bradner, 22 pages.
PCT Search Report and Written Opinion dated Jul. 1, 2020 for PCT Application No. PCT/US2020/028517, 13 pages.
Valve, "Knuckles EV2: Adjust Strap", YouTube, Jun. 2018, retrieved from internet:<URL: https:llwww.youtube.com/watch?time_ continue= 6&v=H ExyOQX5POs&feature=emb title>, 18 pages.
Valve Corporation, "Knuckles EV2: What's New", Sep. 2018, retrieved from Internet <URL:https://steamcommunity com/sharedfiles/ filedetails/?id=1411984190>, 7 Pages.

* cited by examiner

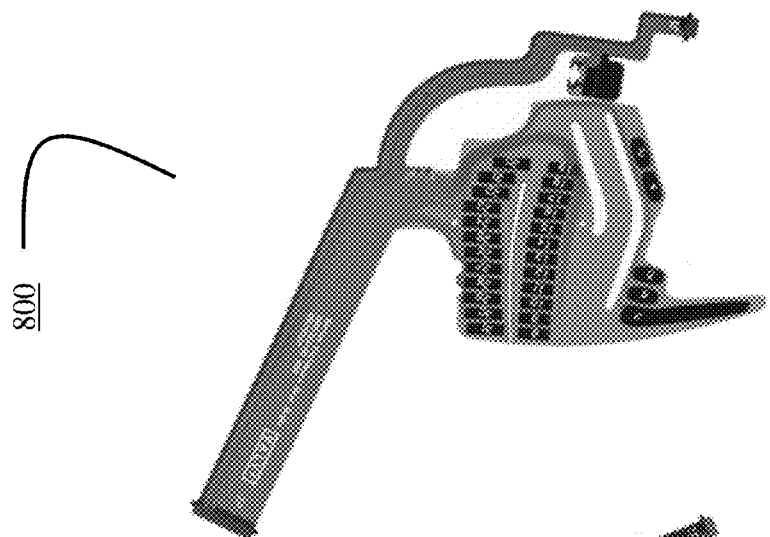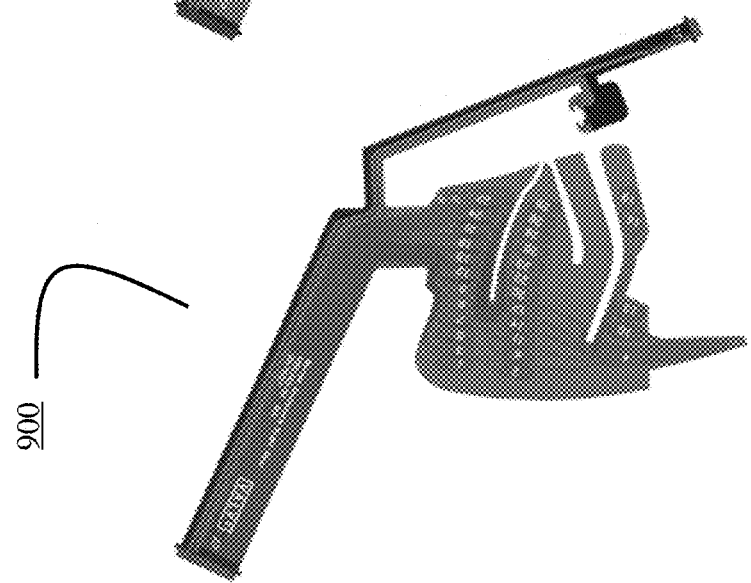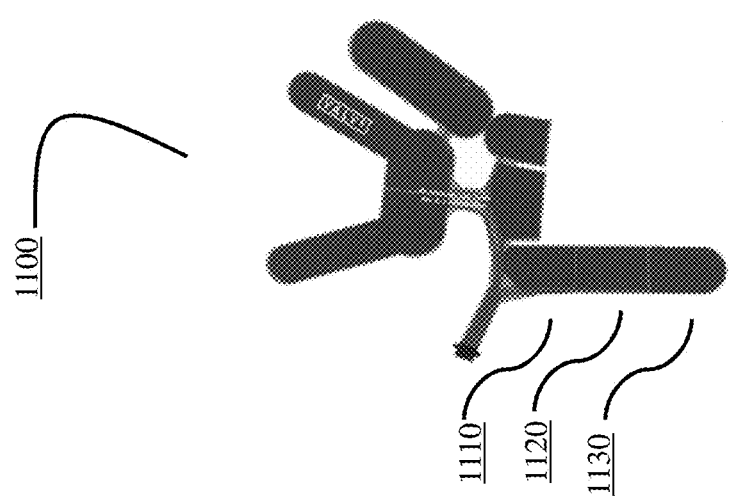

$$\theta_1 = \theta_2 = \theta_3 = 0$$

$C = 0$          $C = 1$

ELECTRONIC CONTROLLER WITH FINGER MOTION SENSING

CROSS-REFERENCE TO RELATED APPLICATION

This application claims the benefit of Provisional Application Ser. No. 62/520,958, filed on Jun. 16, 2017, the contents of which are herein incorporated by reference in their entirety for all purposes.

BACKGROUND

Various hand-held video game controllers have been designed, manufactured, and sold, for a variety of game applications. Some innovations in hand-held controller technology have applicability outside of the video game industry, such as for controllers of industrial machines, defense systems, robotics, etc. Virtual reality (VR) systems are an application of great contemporary interest and rapid technical advancement, both within and outside of the video game industry. Controllers for VR systems are designed to perform several different functions and meet strict (and sometimes competing) constraints, often while optimizing certain desired characteristics such as ease of use and user-defined configurability, for example.

A variety of augmented and/or virtual reality systems and/or environments are known. One current generation of desktop VR experiences is created using head-mounted displays ("HMDs"). Such desktop VR experiences generally try to be fully immersive and disconnect the users' senses from their surroundings.

In the exemplary environment of HMDs typically used in some VR systems, a human user wears a head-mounted virtual reality apparatus that includes displays in close proximity to each of the user's eyes, headphones or other sound-producing devices in or near the user's ears, and one or more hand-held controllers. FIG. 1 is an exemplary diagram of a human user (10) wearing a head-mounted VR display apparatus (22) comprising optical receivers and sensors (23a, 23b, 23c, etc.) that may be used for tracking the position and orientation of the VR display apparatus. Without limitation, HMD's may be tethered to a stationary computer (such as a personal computer ("PC"), laptop, or game console), or alternatively may be self-contained (i.e., with some or all sensory inputs, controllers/computers, and outputs all housed in a single head-mounted device).

Various techniques are known for transposing a physical control device held by the user (also referred to as a controller) into a virtual reality environment in a realistic or augmented form, thus simulating the actual control device held by the user or a variation thereof that is tailored to the virtual environment and/or provides context-specific information. For example, FIG. 2 depicts an exemplary display in a virtual reality environment (50), in which a virtual image of a real game control device (52) is in view of a human user (such as user 10 shown in FIG. 1) who is holding the control device in the real physical environment and wearing a head-mounted VR display apparatus (such as apparatus 22 shown in FIG. 1). For reference, the display in the exemplary virtual environment (50) depicted in FIG. 2 also includes virtual representations of a table (54) and a window (56). A controller program provides the user with a virtual representation of the user's physical control device (52) that can either be realistic or augmented to reflect the virtual context and/or function of the control device and its interactive elements. As the user moves the actual control device in the real physical environment, these movements may be tracked using various techniques known in the art and further described herein to enable corresponding movement of the virtual representation of the control device (52) within the virtual reality environment.

However, the ability to detect and display specific details regarding the position of the user (or parts of the user), the HMD, one or more of the hand-held control devices that may be in use, or any other aspect of the real physical environment depends on the specific configuration of any sensors and tracking systems that are deployed in the HMD VR system. For example, as is well known to skilled artisans, accurate representation of the position and orientation of the HMD and of the associated controllers requires use of appropriate object tracking technology. Similarly, accurate detection and/or representation of where the user may be directing his or her gaze may require use of appropriate eye-tracking technology.

To further improve a user's experiences with systems such as VR HMDs, it would be advantageous to provide better solutions for tracking and displaying the position of one or more of a user's fingers as the user moves his or her fingers relative to a part (such as the handle portion) of a control device that the user holds during a VR session.

Hence, there is a need in the art for improved controller designs and techniques that may improve systems such as VR HMDs and/or better facilitate user operation by providing new finger tracking and/or gesture detection solutions.

BRIEF DESCRIPTION OF THE DRAWINGS

FIGS. 11A, 11B, and 11C depict three embodiments of a grip FPC according to aspects of the present invention, showing possible changes in pad count, spacing, and routing.

SUMMARY OF ASPECTS OF THE INVENTION

Figure 1:
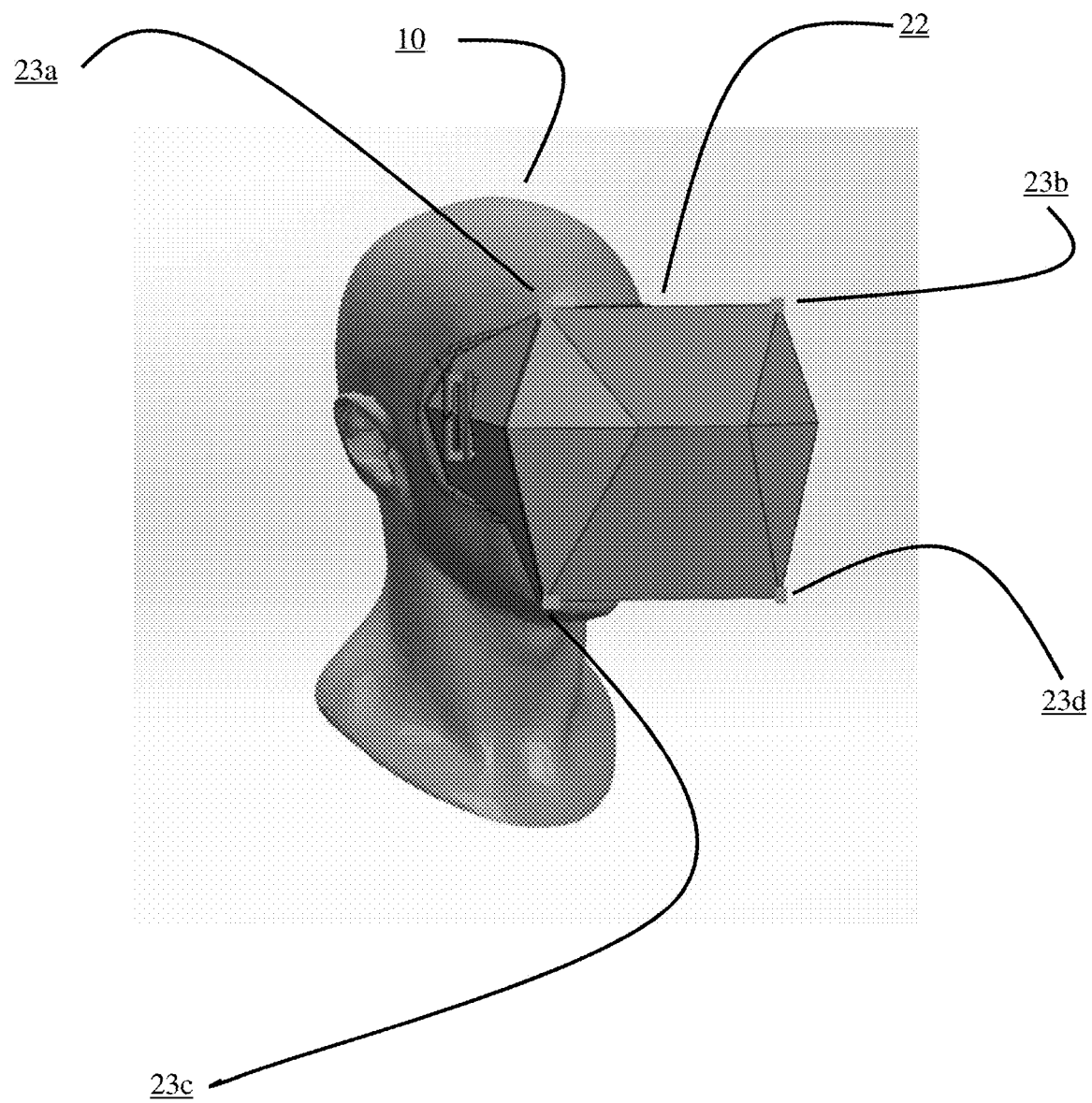
FIG. 1 is an exemplary diagram of a human user wearing a head-mounted virtual reality apparatus for use with aspects of certain embodiments of the present invention.
Figure 2:
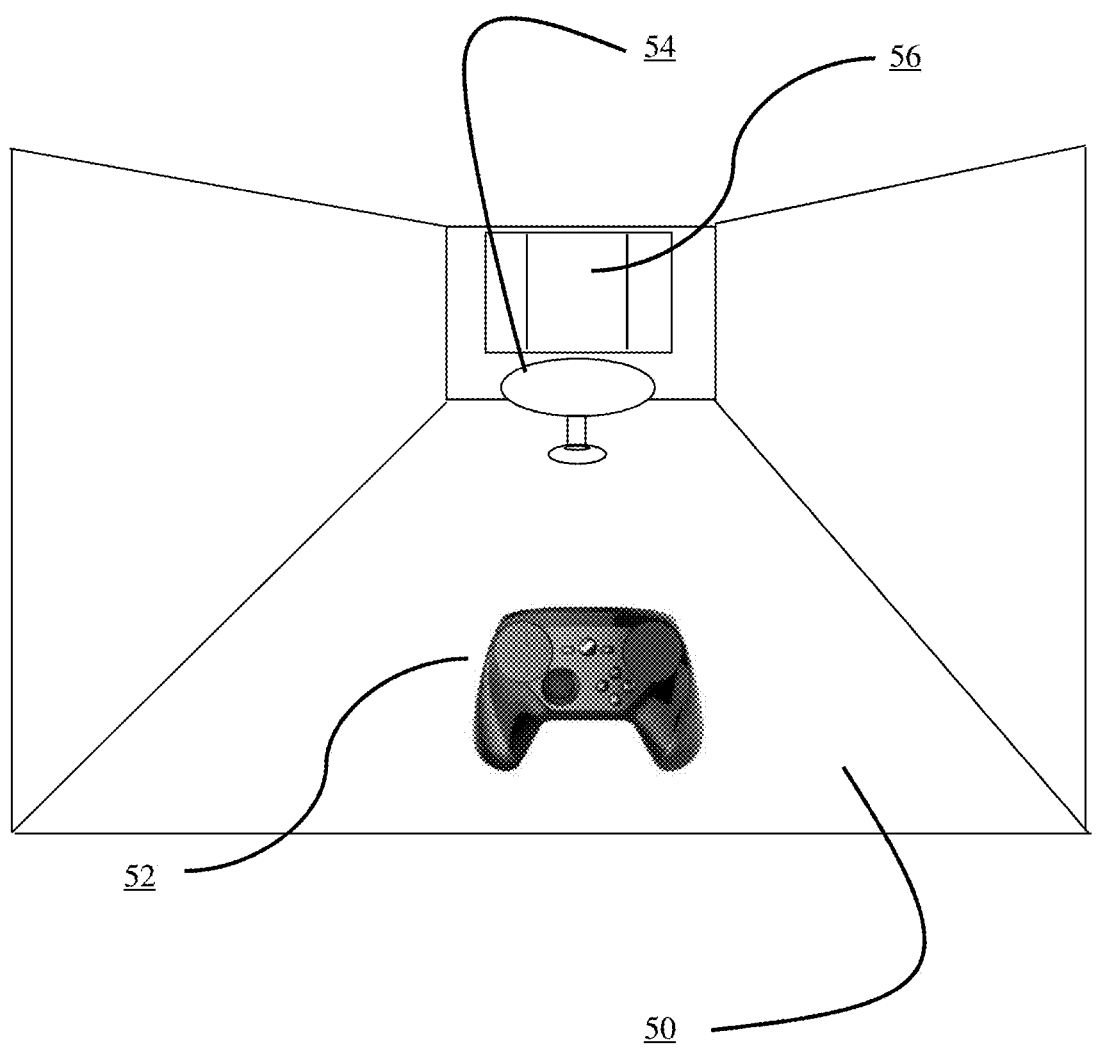
FIG. 2 is an exemplary display in a virtual reality environment according to certain embodiments of the present invention, in which a virtual image of a real game controller is in view along with virtual images of other objects.

Depending on the requirements of each particular implementation, a hand-held controller for electronic systems in accordance with aspects of the present invention, for operation by a user having a hand with fingers and a palm, includes a controller body having a handle portion with an outside surface, a proximity sensor (which may be an array of proximity sensors that are spatially distributed on, in, beneath, or near the outer surface of the handle portion), the proximity sensor being responsive to a proximity of the user's fingers to the outside surface of the handle portion to produce a first output, and a finger tracker for converting the output of the proximity sensor to a set of joint angles corresponding to one or more of the user's fingers. For example, an array of proximity sensors may be incorporated into a set of one or more flexible printed circuits ("FPCs") that are glued into or otherwise attached or embedded into the handle portion of the controller shell.

The controller may further include a renderer for processing the plurality of joint angles to deform a hand mesh that is rendered for display.

Also, depending on each set of particular implementation requirements, a finger tracking method in accordance with aspects of the present invention includes sensing the output of a proximity sensor, which may be an array of proximity sensors that are spatially distributed on, in, beneath, or near an outer surface of a handle portion of a user hand-held controller (e.g., an array of proximity sensors may be incorporated into a set of one or more FPCs that are glued into or otherwise attached or embedded into the handle portion of the controller shell), with the proximity sensor being responsive to a proximity of a user's fingers to the outer surface of the handle portion, calculating a plurality of values to facilitate normalization of the output of the array of proximity sensors with respect to the user and thereby generating a set of normalized finger detection data, and processing the set of normalized finger detection data through a set of curl logic to produce a linear estimate of gross finger curl with respect to the user and thereby generating a set of estimates for one or more finger joint angles corresponding to the user. The finger tracking method may further include deforming a hand mesh based on the set of estimates for the plurality of finger joint angles corresponding to the user and thereby generating a deformed hand mesh that may be rendered for display, either to the user or to others. The finger tracking method may further include initializing the method by monitoring the output of the array of proximity sensors until detecting a predetermined hand gesture by the user.

DETAILED DESCRIPTION OF EXAMPLE EMBODIMENTS

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

FIGS. 3-7 depict a controller 100 for an electronic system according to an example embodiment of the present invention. The controller 100 may be utilized by an electronic system such as a VR video gaming system, a robot, weapon, or medical device. The controller 100 may include a controller body 110 having a handle portion 112, and a hand retainer 120 to retain the controller 100 in the hand of a user (e.g., the user's left hand). The handle portion 112 may optionally be substantially cylindrical. In this context, a substantially cylindrical shape need not have constant diameter, or a perfectly circular cross-section.

In the embodiment of FIGS. 3-7, the controller body 110 may include a distal head (between the handle portion 112 and a distal end 111), which may optionally include one or more thumb-operated controls 114, 115, 116. For example, a tilting button, or any other button, knob, wheel, joystick, or trackball may be considered as a thumb-operated control if it may be conveniently manipulated by a user's thumb during normal operation while the controller 100 is held in the hand of the user.

The controller 100 preferably includes a tracking arc 130 that is fixed to the controller body 110, and optionally includes two noses 132, 134, each protruding from a corresponding one of two opposing distal ends of the tracking arc 130. The tracking arc 130 preferably includes a plurality of tracking sensors disposed therein, with at least one tracking sensor disposed in each protruding nose 132, 134. Additional tracking sensors may be disposed also in the controller body 110, with preferably at least one distal tracking sensor disposed adjacent the distal end 111.

The foregoing tracking sensors are preferably responsive to electromagnetic radiation emitted by the electronic system. For example, the electronic system may be a VR gaming system that widely broadcasts, i.e. paints, pulsed infra-red radiation (i.e. IR light) towards the controller 100, with the plurality of tracking sensors of the tracking arc 130 being IR light sensors that may receive or be shadowed from the broadcast pulsed IR light. The tracking sensors in each nose 132, 134 (e.g. 3 sensors in each nose) preferably overhang the user's hand on each distal end of the tracking arc 130, and so are better exposed (around the user's hand) to the electromagnetic radiation emitted by the electronic system, at more angles without an unacceptable amount of shadowing.

In certain embodiments, each of the IR light sensors may be covered by a layer of IR-transmissive polycarbonate plastic, which may form a window to permit IR light to affect that sensor. For example, the IR-transmissive plastic may be thin (e.g. a laminated film). In certain embodiments, each of the IR light sensors may be recessed into the tracking arc 130, with the IR transmissive polycarbonate plastic forming a narrow window above it, so that each sensor receives IR light only from a preferred angular range (e.g. to avoid undesired internal IR reflections).

In other embodiments, the tracking arc 130 and the controller body 110 may be fabricated from an IR-transmissive plastic, with an outer IR-opaque coating to reduce undesired internal IR reflections. In such embodiments, the outer IR-opaque coating may include openings over the locations of the infrared (IR) light sensors. The response of the plurality of tracking sensors may be communicated back to the electronic system, and the system may interpret such response to effectively track the location and orientation of the controller 100.

Preferably, the tracking arc 130 and the controller body 110 are made of a substantially rigid material such as hard plastic, and are firmly fixed together so that they do not appreciably translate or rotate relative to each other. In this way, the tracking of the translation and rotation of the constellation of tracking sensors in space, is preferably not complicated by motion of the tracking sensors relative to each other. For example, as shown in FIGS. 3-7, the tracking arc 130 may be fixed to the controller body 110 by being joined to the controller body 110 at two locations. The hand retainer 120 may be attached to the controller 100 (either the controller body 110 or the tracking arc 130) adjacent those two locations, to bias the user's palm against the outside surface of the handle portion 112 between the two locations.

In certain embodiments, the tracking arc 130 and the controller body 110 may comprise an integral monolithic component having material continuity, rather than being assembled together. For example, the tracking arc 130 and the controller body 110 may be molded together by a single injection-molding process step, resulting in one integral hard plastic component that comprises both the tracking arc 130 and the controller body 110. Alternatively, the tracking arc 130 and the controller body 110 may be initially fabricated separately, and then later assembled together. Either way, the tracking arc 130 may be considered as fixed to the controller body 110.

Figure 3:
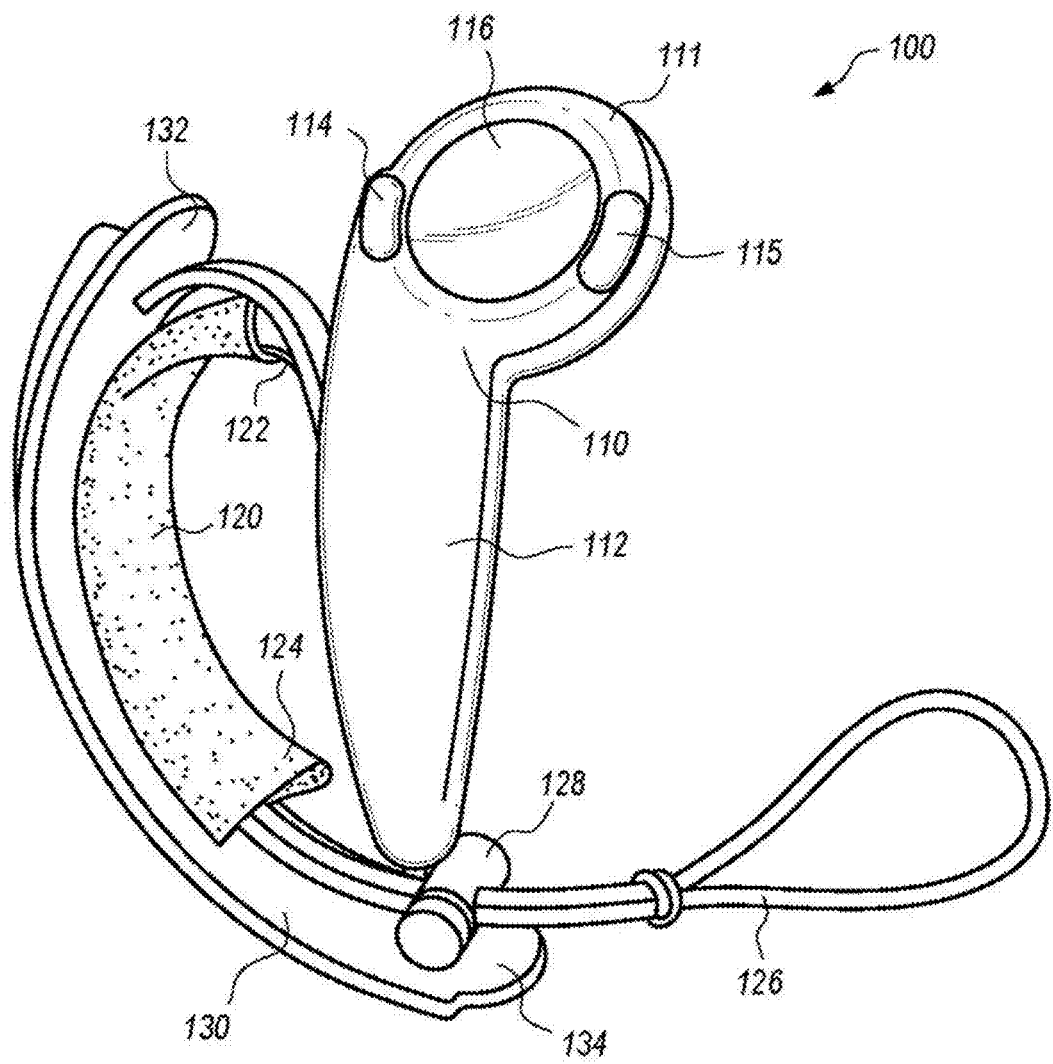
FIG. 3 depicts a controller according to aspects of the present invention, with a hand retainer in an open position.

The hand retainer 120 is shown in the open position in FIG. 3. The hand retainer 120 may optionally be biased in the open position by a curved resilient member 122, to facilitate the insertion of the user's left hand between the hand retainer 120 and the controller body 110 when the user is grasping for the controller with vision blocked by VR goggles (i.e., an HMD). For example, the curved resilient member 122 may optionally be a flexible metal strip that elastically bends, or may comprise an alternative plastic material such as nylon that may bend substantially elastically. The curved resilient member 122 may optionally be partially or completely internal to or covered by a cushion or fabric material 124 (e.g. a neoprene sheath), for the user's comfort. Alternatively, the cushion or fabric material 124 may be disposed on (e.g. adhered to) only the side of the curved resilient member 122 that faces the user's hand.

The hand retainer 120 optionally may be adjustable in length, for example by including a draw cord 126 that is cinched by a spring-biased chock 128. The draw cord 126 may optionally have an excess length that may be used as a lanyard. The sheath 124 optionally may be attached to the draw cord. In certain embodiments, the curved resilient member 122 may be preloaded by the tension of the cinched draw cord 128. In such embodiments, the tension that the curved resilient member 122 imparts to the hand retainer 120 (to bias it in the open position) causes the hand retainer to automatically open when the draw cord 128 is un-cinched. This disclosure also contemplates alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc.

Figure 4:
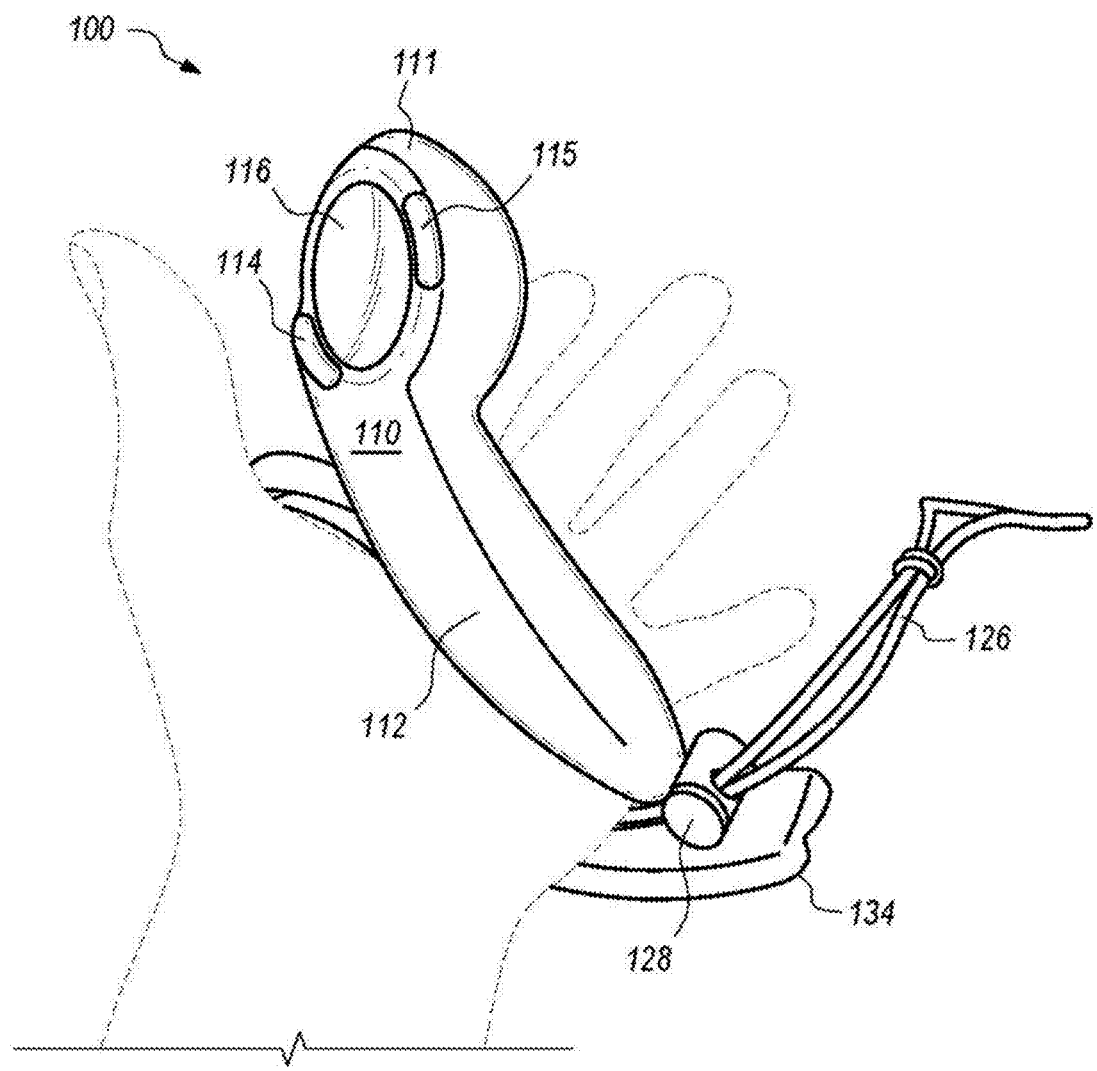
FIG. 4 depicts the controller of FIG. 3 in a user's open hand, palm up.
Figure 5:
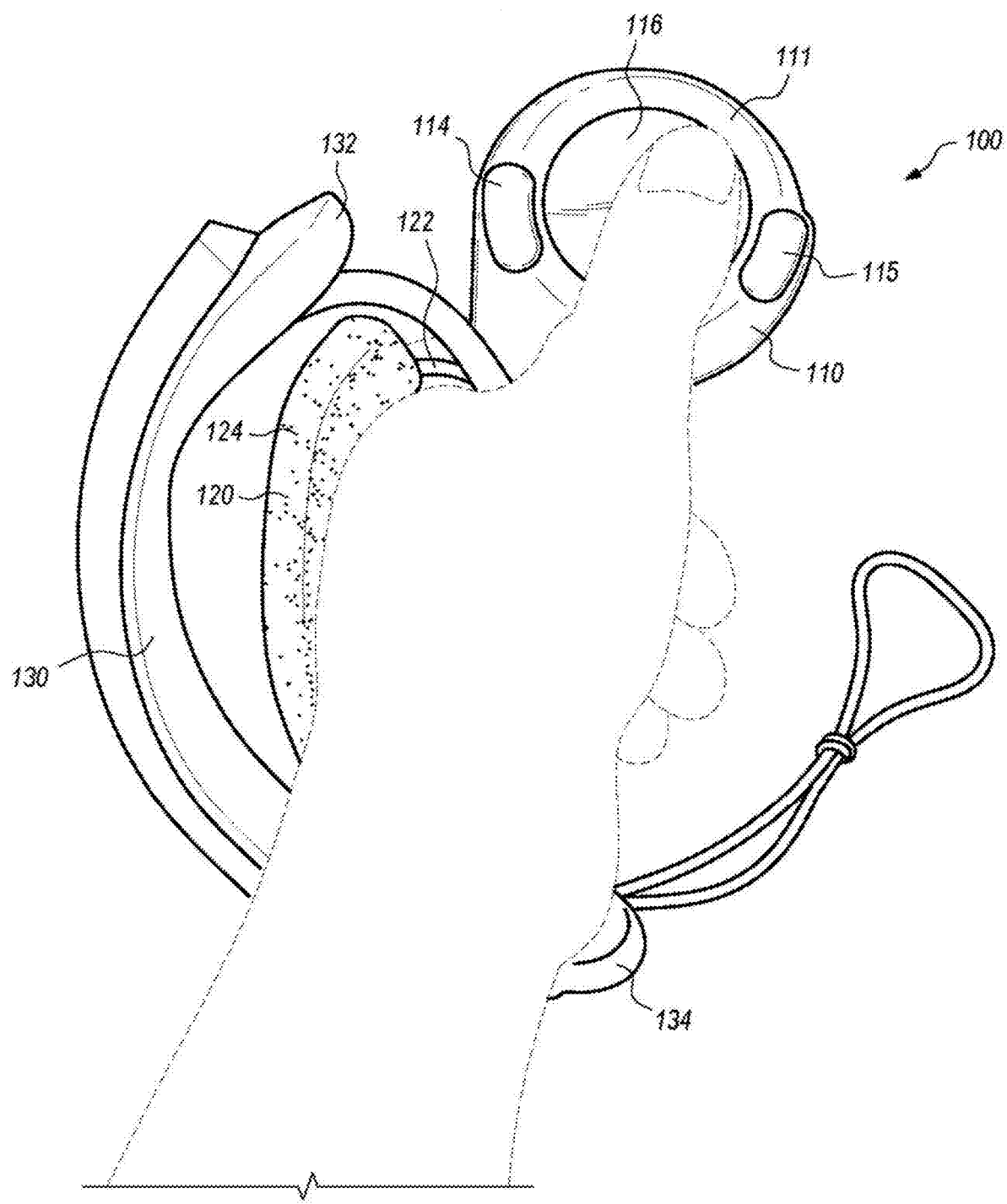
FIG. 5 depicts the controller of FIG. 3 in a user's closed hand.
Figure 6:
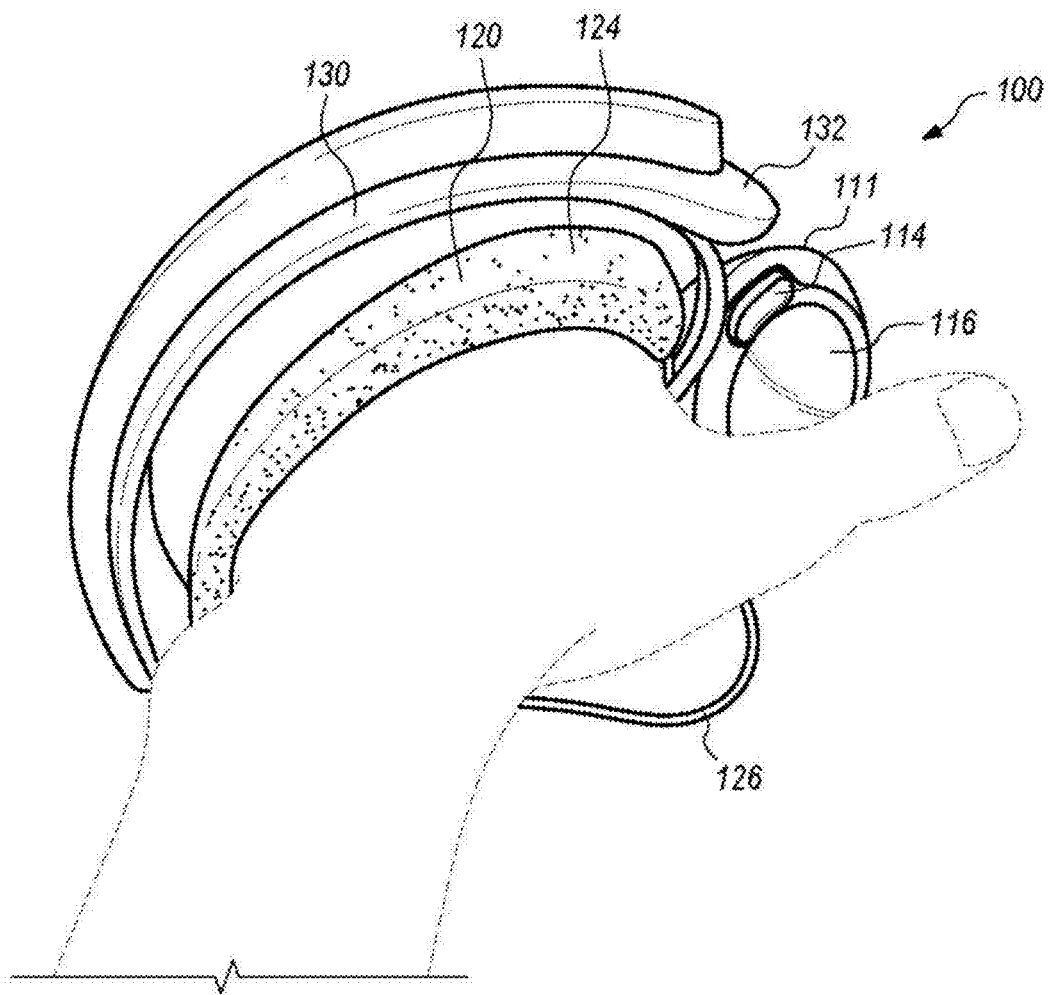
FIG. 6 depicts the controller of FIG. 3 in a user's hand, palm down.

The hand retainer 120 may be disposed between the handle portion 112 and the tracking arc 130, and may be configured to contact a back of the user's hand. FIG. 4 shows the controller 100 during operation with the user's left hand inserted therein but not grasping the controller body 110. In FIG. 4, the hand retainer is closed and tightened over the hand, to physically bias the user's palm against the outside surface of the handle portion 112. In that way, the hand retainer, when closed, may retain the controller 100 to the hand even when the hand is not grasping the controller body 110. FIGS. 5 and 6 depict the controller 100 during operation when the hand retainer 120 is closed, and the hand is grasping the controller body 110 and the thumb is operating one or more of the thumb-operated controls (e.g. track pad 116).

The handle portion 112 of the controller body 110 preferably includes an array of proximity sensors that are spatially distributed partially or completely around its outer surface. The array of proximity sensors is preferably responsive to the proximity of the user's fingers to the outside surface of the handle portion 112. For example, the array of proximity sensors may be a plurality of capacitive sensors embedded under the outer surface of the handle portion 112, with that outer surface comprising an electrically insulative material. The capacitance between such an array of capacitive sensors and a portion of the user's hand is inversely related to the distance therebetween. The capacitance may be sensed by connecting an RC oscillator circuit to an element of the capacitance sensor array, noting that the time constant of the circuit (and therefore the period and frequency of oscillation) will vary with the capacitance. In this way, the circuit may detect a release of a user's fingers from the outer surface of the handle portion 112.

When the hand retainer 120 (e.g. a hand-retention strap) is closed tightly, it may serve not only to prevent the controller 100 from falling out of hand, but also to keep fingers from excessively translating relative to the proximity sensor array of the handle portion 112, to more reliably sense finger motion. The electronic system may include an algorithm embodying anatomically-possible motions of fingers, to better use the sensing from the proximity sensor array to render the opening of a controlled character's hand, finger pointing, or other motions of fingers relative to controller or relative to each other. In this way, the user's movement of the controller 100 and/or fingers may help control a VR gaming system, defense system, medical system, industrial robot or machine, or another device. In VR system applications (e.g. for gaming, training, etc.), the system may render a throwing motion based on the movement of the tracking sensors, and may render the release of a thrown object based on the sensed release of the user's fingers from the outer surface of the handle portion of the controller.

Hence, the function of the hand retainer 120 (to allow the user to "let go" of the controller 100 without the controller 100 actually separating from the hand or being thrown or dropped to the floor) may enable additional functionality of the controlled electronic system. For example, if the release and restoration of the user's grasp of the handle portion 112 of the controller body 110 is sensed, then such release or grasping may be incorporated into the game to display (e.g. in VR) throwing or grasping objects. The hand retainer 120 may allow such a function to be accomplished repeatedly and safely. For example, the location of the hand retainer 120 in the embodiment of FIGS. 3-7 may help the tracking arc 130 to protect the back of the user's hand from impacts in real world, for example when the user moves in response to a prompt sensed in the VR environment (e.g. while practically blinded by VR goggles).

In certain embodiments, the controller 100 may include a rechargeable battery disposed within the controller body 110, and the hand retainer 120 (e.g. hand retention strap) may include an electrically-conductive charging wire that is electrically coupled to the rechargeable battery. The controller 100 preferably also includes a radio frequency (RF) transmitter for communication with the rest of the electronic system. Such RF transmitter may be powered by the rechargeable battery and may be responsive to the thumb-operated controls 114, 115, 116, the proximity sensors in the handle portion 112 of the controller body 110, and/or the tracking sensors in the tracking arc 130.

Figure 7:
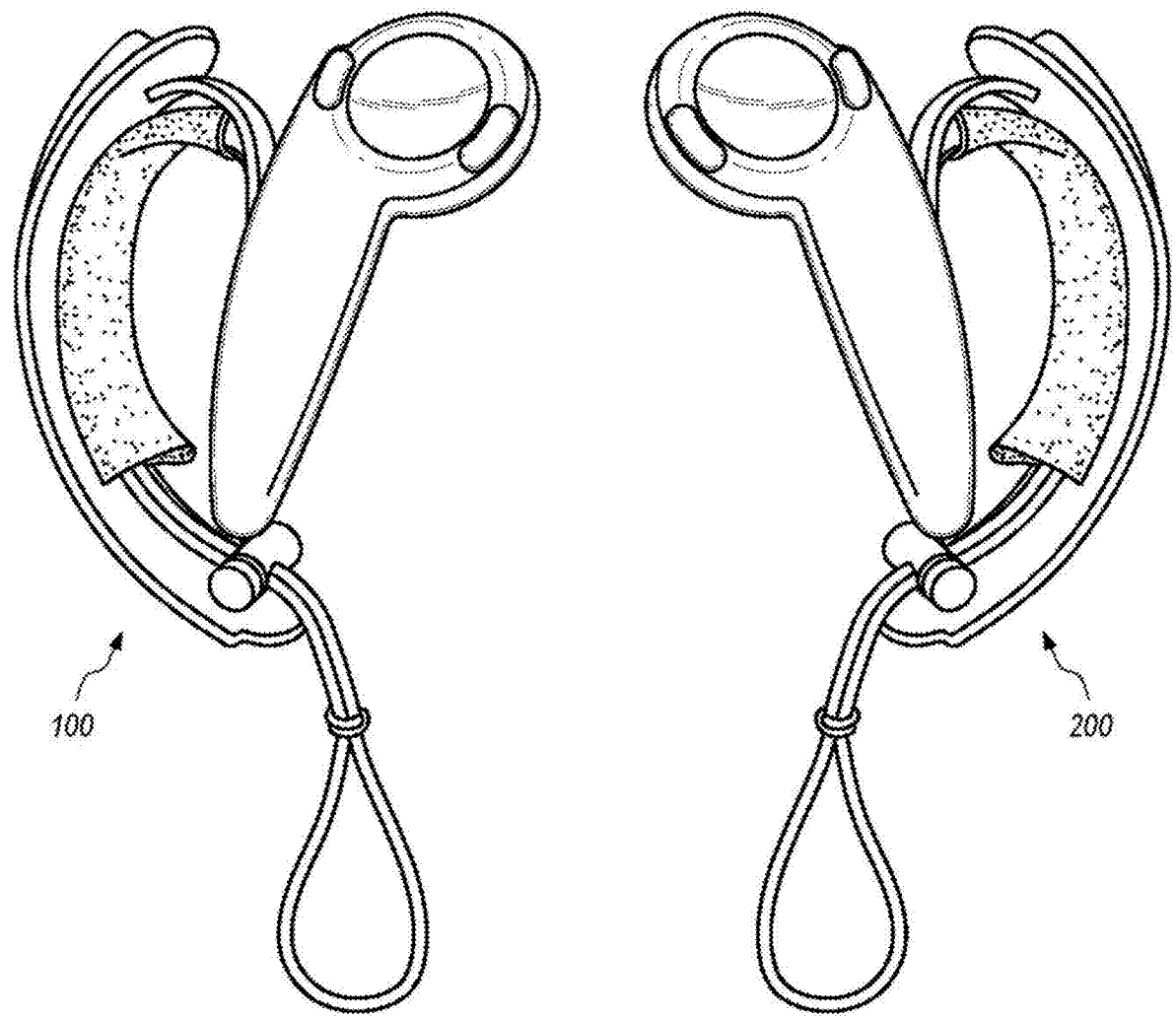
FIG. 7 depicts a pair of controllers according to aspects of the present invention, with hand retainers in an open position.

As shown in FIG. 7, in certain embodiments the controller 100 may be the left controller in a pair of controllers that includes a similar right controller 200. In certain embodiments, the controllers 100 and 200 may (together) track the motion and grip of both of a user's hands and fingers, simultaneously, for example to enhance a VR experience.

In certain embodiments, for each finger, a linear array of capacitive sensors is placed inside the corresponding controller shell, e.g., within handle portion 112 of the controller body 110, as shown in FIGS. 3 and 4. The sensor pads are placed and sized to accommodate the widest range of hand sizes and grip types while also minimizing crosstalk between fingers. These linear arrays are incorporated into a set of flexible printed circuits ("FPC's") that are glued into the shell. Thus, depending on the requirements of each particular implementation, the array of proximity sensors may be spatially distributed on, in, beneath, or near the outer surface of the handle portion of a user hand-held controller. In certain embodiments, without limitation, a portion of the array of proximity sensors may be embedded into the handle portion of the controller. In certain embodiments, a portion of the array of proximity sensors be located in areas other than the handle portion 112 of the controller body 110, such as near the top of the controller (near where the user's thumb would normally be located) and/or near the underside of the top of the controller (near where the user's index finger would normally be located, to operate a trigger or other suitable button or actuator).

Figure 8:
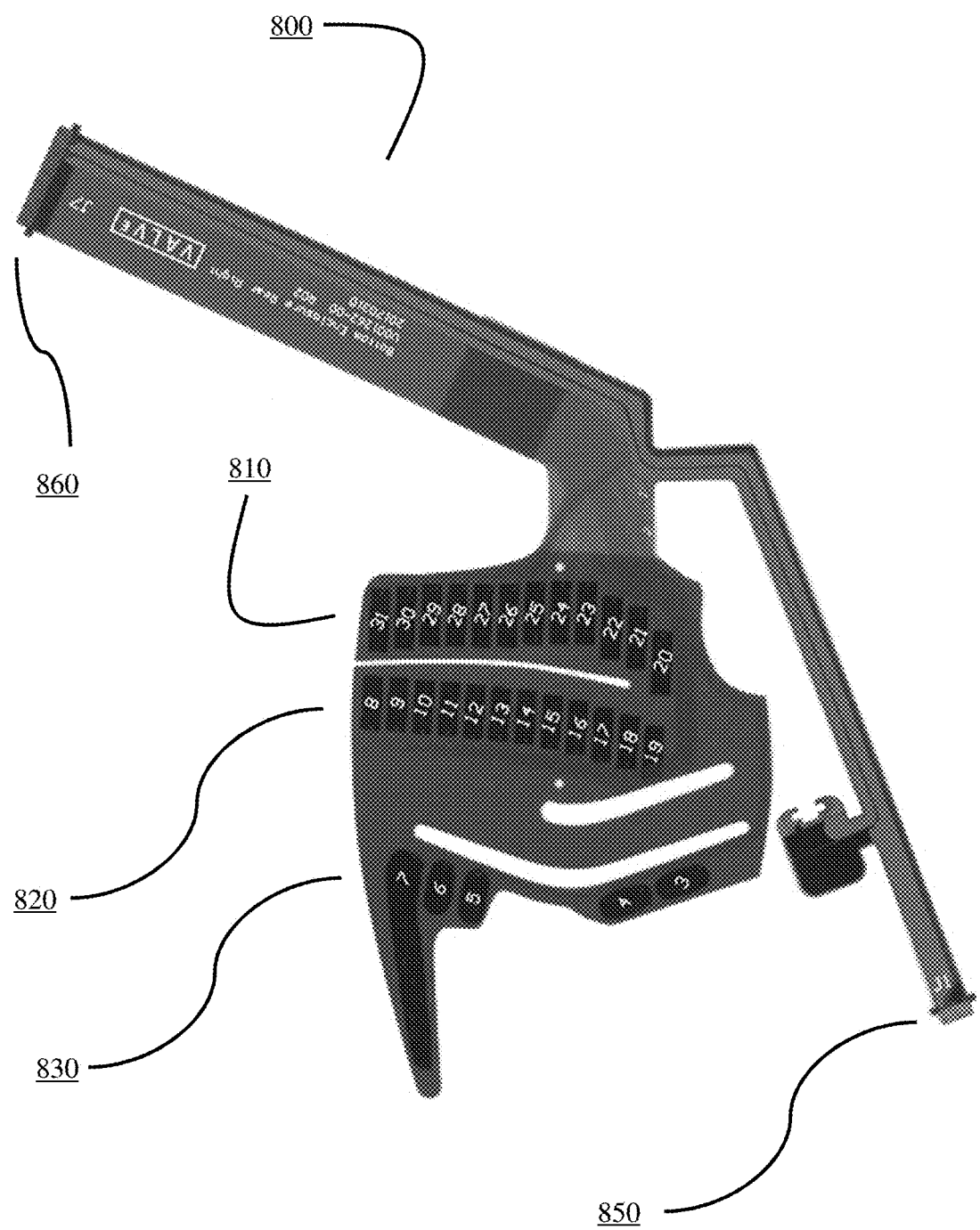
FIG. 8 depicts an exemplary flexible printed circuit ("FPC"), showing linear pad arrays for the middle, ring, and pinky fingers along the top, center, and bottom, respectively, in certain embodiments according to aspects of the present invention.

A commercially available capacitive sensing integrated circuit ("chip") is used in certain embodiments to interface to these pads and provide the raw capacitive sensor values which are fed into a finger tracking algorithm, described in further detail later in this document with reference to certain embodiments. FIG. 8 depicts an exemplary such FPC (800), showing linear pad arrays for the middle (810), ring (820), and pinky (830) fingers along the top, center, and bottom of the FPC, respectively. The middle finger sensing zone as shown in FIG. 8 includes sensors labeled 20, 21, 22, 23, 24, 25, 26, 27, 28, 29, 30, and 31. The ring finger sensing zone as shown in FIG. 8 includes sensors labeled 8, 9, 10, 11, 12, 13, 14, 15, 16, 17, 18, and 19. The pinky finger sensing zone as shown in FIG. 8 includes sensors labeled 3, 4, 5, 6, and 7. Connectors 850 (also designated as "J1") and 860 (also designated as "J7") facilitate coupling of the electrical signals used in the FPC-implemented proximity sensing array shown in FIG. 8 to other components of the finger tracking systems in accordance with aspects of the present invention (not shown). Proximity sensing arrays for the index finger and thumb may also be provided depending on the particular requirements of each implementation, as skilled artisans will recognize. Relevant aspects of the invention are described in more detail later in this document.

Figure 9:
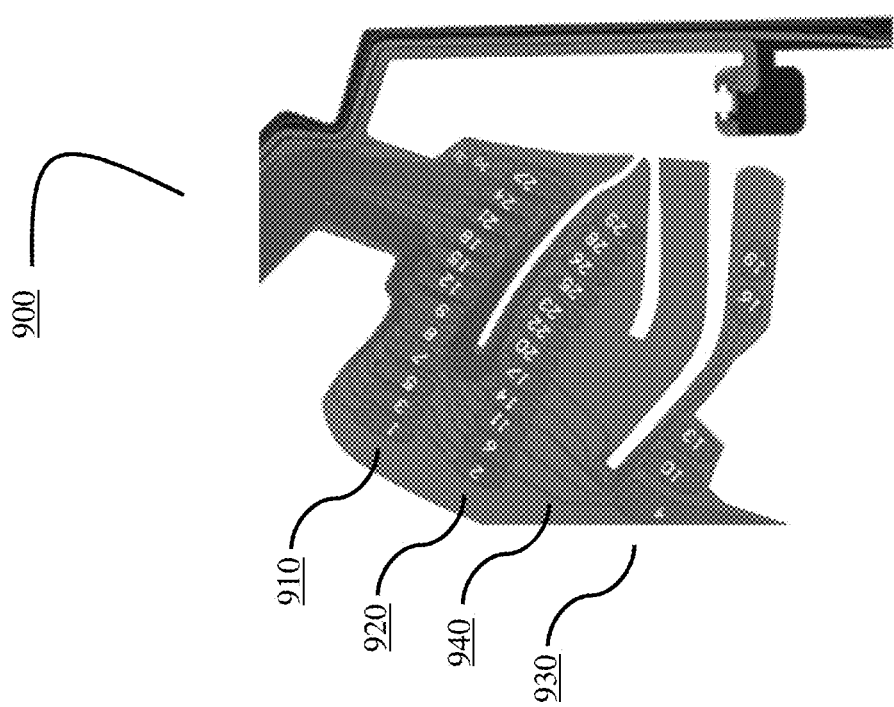
FIG. 9 depicts a close-up of an exemplary FPC in certain embodiments according to aspects of the present invention.

With respect to trace routing in certain embodiments, design goals include minimizing trace lengths and widths as much as possible, routing traces away from adjacent fingers, and keeping large power or ground planes away from sensing pads and traces. FIG. 9 depicts a close-up of an exemplary FPC according to aspects of the present invention, developed while keeping the foregoing design goals in mind. Similarly to FIG. 8, FIG. 9 depicts linear pad arrays for the middle (910), ring (920), and pinky (930) fingers along the top, center, and bottom of the FPC, respectively.

The middle finger sensing zone as shown in FIG. 9 includes sensors labeled 1, 3, 5, 7, 8, 9, 12, 15, 18, 21, 24, and 27. The ring finger sensing zone as shown in FIG. 9 includes sensors labeled 2, 6, 11, 14, 17, 20, 22, 23, 25, 26, 28, and 29. The pinky finger sensing zone as shown in FIG. 9 includes sensors labeled 4, 10, 13, 16, and 19. As shown in FIG. 9, the length and position of the traces (i.e., electrical interconnections) within the FPC-implemented proximity sensor array are determined as part of the design process, as skilled artisans will recognize. For example, exemplary trace 940 depicted in FIG. 9 is relatively long, and it is located on the finger side (as opposed to the palm side) of the FPC.

In some embodiments, there may be asymmetric cross coupling between finger pads. That is, for example, moving the middle finger may significantly affect the capacitive readings for the ring and pinky fingers, but not vice versa. This may be due to trace routing. Because the sensing pads must be located far from the main board in certain embodiments, the traces to reach them can themselves be quite long. As a result, the copper area of the traces could be as much as 10% of the sensing pad area in certain embodiments, causing the traces to act as weak sensing pads along their lengths. This may become problematic when the traces for the ring and pinky fingers are routed directly under the middle finger, for example.

Figure 10:
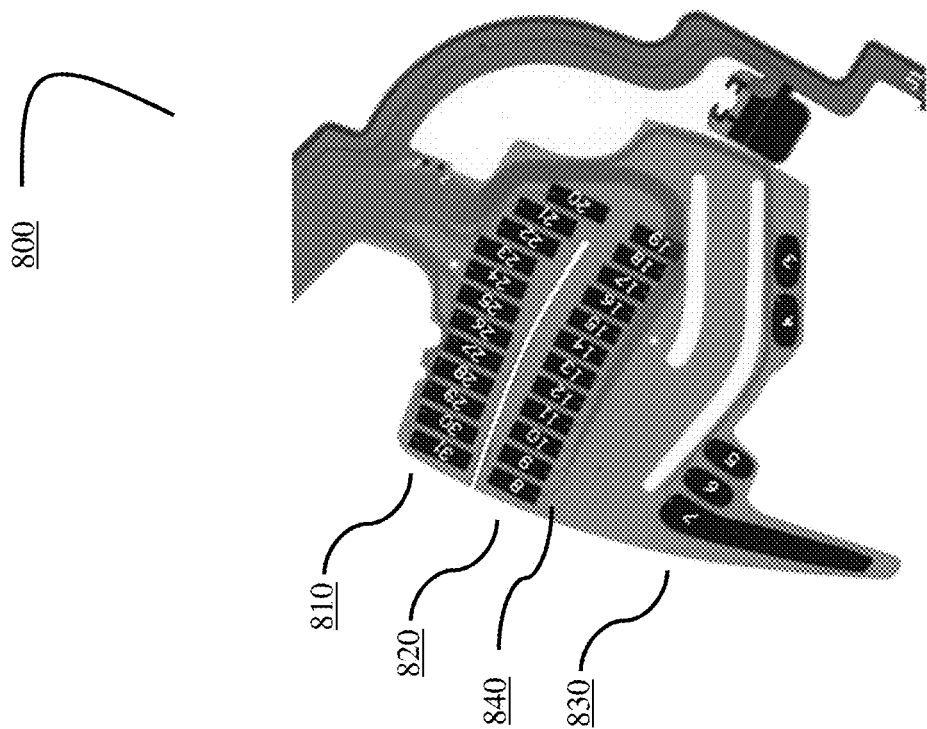
FIG. 10 depicts a close up of another exemplary FPC in certain embodiments according to aspects of the present invention, showing how traces may be shortened and moved to the palm-side of the FPC.

By routing all traces to the palm side of the hand in certain embodiments, the adverse effects of trace capacitance may be almost completely removed. The traces may still act as a weak sensing element. However, because the palm makes consistent contact with the controller in certain embodiments, the effect can be calibrated out. FIG. 10 depicts a close-up of another exemplary FPC in certain embodiments according to aspects of the present invention, showing how traces may be shortened and moved to the palm-side of the FPC. Similarly to FIGS. 8 and 9, FIG. 10 depicts linear pad arrays for the middle (810), ring (820), and pinky (830) fingers along the top, center, and bottom of the FPC, respectively. In contrast to FIG. 9, the traces of FIG. 10 are relatively shorter and have been located on the palm side of the FPC, such that they are not generally visible in FIG. 10

(although some relatively short traces, such as trace (840), may be observed). The FPC depicted in FIG. 10 generally corresponds to the FPC depicted in FIG. 8, and therefore those two figures use the same numerals to refer to the same or like parts.

With respect to active trace capacitance correction in certain embodiments, a separate method that may be employed is to use a palm facing pad to estimate the trace capacitance bias. This can be accomplished by assigning a small, negative weight to all palm-facing pads along the length of a given trace bundle. More generally, the weighted sum can be used to negate the cross coupling between adjacent pads and traces to a first order.

In certain embodiments, smaller, more numerous pads are preferred, with linear pad arrays allocated to each finger and spaced as far apart as possible. FIGS. 11A, 11B, and 11C depict three embodiments (1100, 900, and 800, respectively) of a grip FPC according to aspects of the present invention, showing possible changes in pad count, spacing, and routing. In general, FIGS. 11A, 11B, and 11C depict how FPC designs evolved with respect to particular implementations. FIG. 11A depicts an older FPC design (1100), with fewer capacitance sensing zones and less sophisticated trace routing in comparison to the later FPC design shown (900) in FIG. 11B (which generally corresponds to FIG. 9). For example, FIG. 11A depicts an early design of an exemplary such FPC (1100), showing linear pad arrays for the middle (1110), ring (1120), and pinky (1130) fingers along the top, center, and bottom of the FPC, respectively. However, the middle finger sensing zone 1110 as shown in FIG. 11A includes a single sensor. Similarly, the ring finger sensing zone 1120 as shown in FIG. 11A includes a single sensor, and the pinky finger sensing zone 1130 as shown in FIG. 11A also includes a single sensor. FIG. 11C (item 800) depicts even further refinements (as also shown in FIGS. 8 and 10, and as described earlier).

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Figure 12:
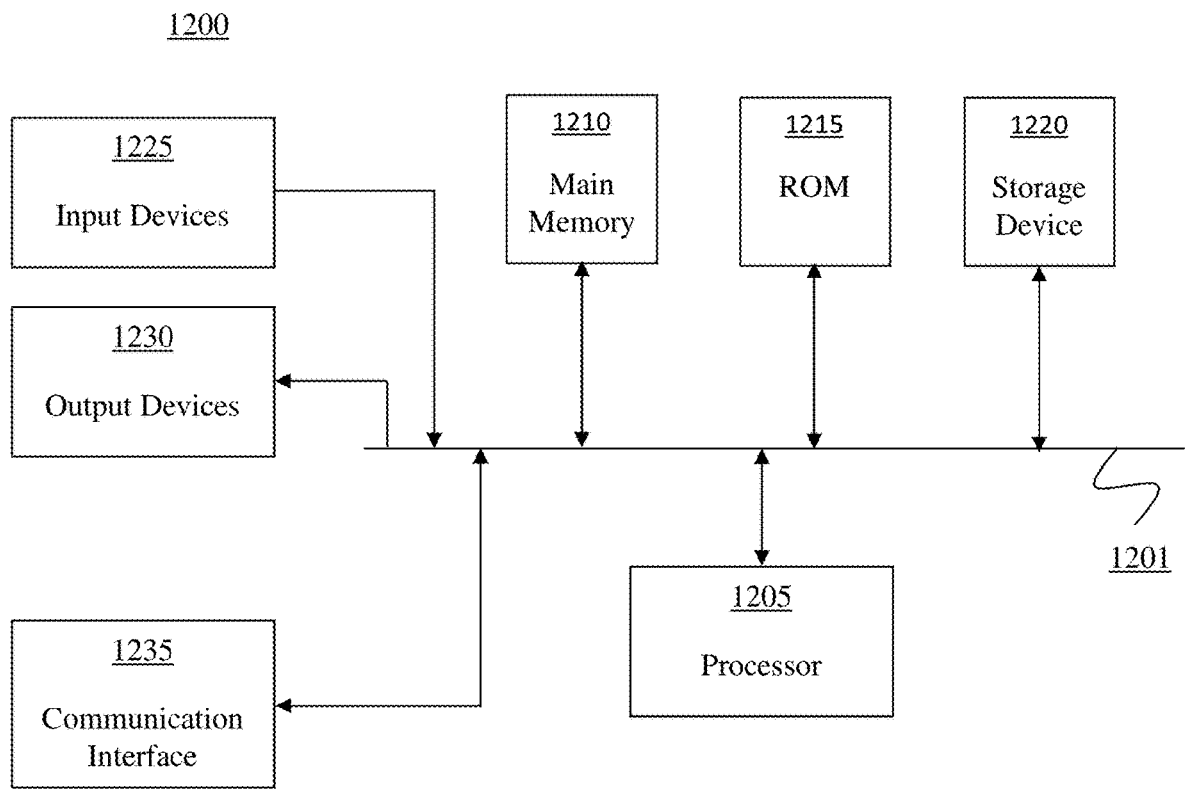
FIG. 12 is an exemplary diagram of a computing device that may be used to implement aspects of certain embodiments of the present invention.

FIG. 12 is an exemplary diagram of a computing device 1200 that may be used to implement aspects of certain embodiments of the present invention. Computing device 1200 may include a bus 1201, one or more processors 1205, a main memory 1210, a read-only memory (ROM) 1215, a storage device 1220, one or more input devices 1225, one or more output devices 1230, and a communication interface 1235. Bus 1201 may include one or more conductors that permit communication among the components of computing device 1200.

Processor 1205 may include any type of conventional processor, microprocessor, or processing logic that interprets and executes instructions. Main memory 1210 may include a random-access memory (RAM) or another type of dynamic storage device that stores information and instructions for execution by processor 1205. ROM 1215 may include a conventional ROM device or another type of static storage device that stores static information and instructions for use by processor 1205. Storage device 1220 may include a magnetic and/or optical recording medium and its corresponding drive. Input device(s) 1225 may include one or more conventional mechanisms that permit a user to input information to computing device 1200, such as a keyboard, a mouse, a pen, a stylus, handwriting recognition, voice recognition, biometric mechanisms, and the like. Output device(s) 1230 may include one or more conventional mechanisms that output information to the user, including a display, a projector, an A/V receiver, a printer, a speaker, and the like. Communication interface 1235 may include any transceiver-like mechanism that enables computing device/server 1200 to communicate with other devices and/or systems. Computing device 1200 may perform operations based on software instructions that may be read into memory 1210 from another computer-readable medium, such as data storage device 1220, or from another device via communication interface 1235. The software instructions contained in memory 1210 cause processor 1205 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, memory 1210 may include, without limitation, high-speed random access memory, such as DRAM, SRAM, DDR RAM or other random access solid state memory devices; and may include, without limitation, non-volatile memory, such as one or more magnetic disk storage devices, optical disk storage devices, flash memory devices, or other non-volatile solid state storage devices. Memory 1210 may optionally include one or more storage devices remotely located from the processor(s) 1205. Memory 1210, or one or more of the storage devices (e.g., one or more non-volatile storage devices) in memory 1210, may include a computer readable storage medium. In certain embodiments, memory 1210 or the computer readable storage medium of memory 1210 may store one or more of the following programs, modules and data structures: an operating system that includes procedures for handling various basic system services and for performing hardware dependent tasks; a network communication module that is used for connecting computing device 1210 to other computers via the one or more communication network interfaces and one or more communication networks, such as the Internet, other wide area networks, local area networks, metropolitan area networks, and so on; a client application that may permit a user to interact with computing device 1200.

Figure 13:
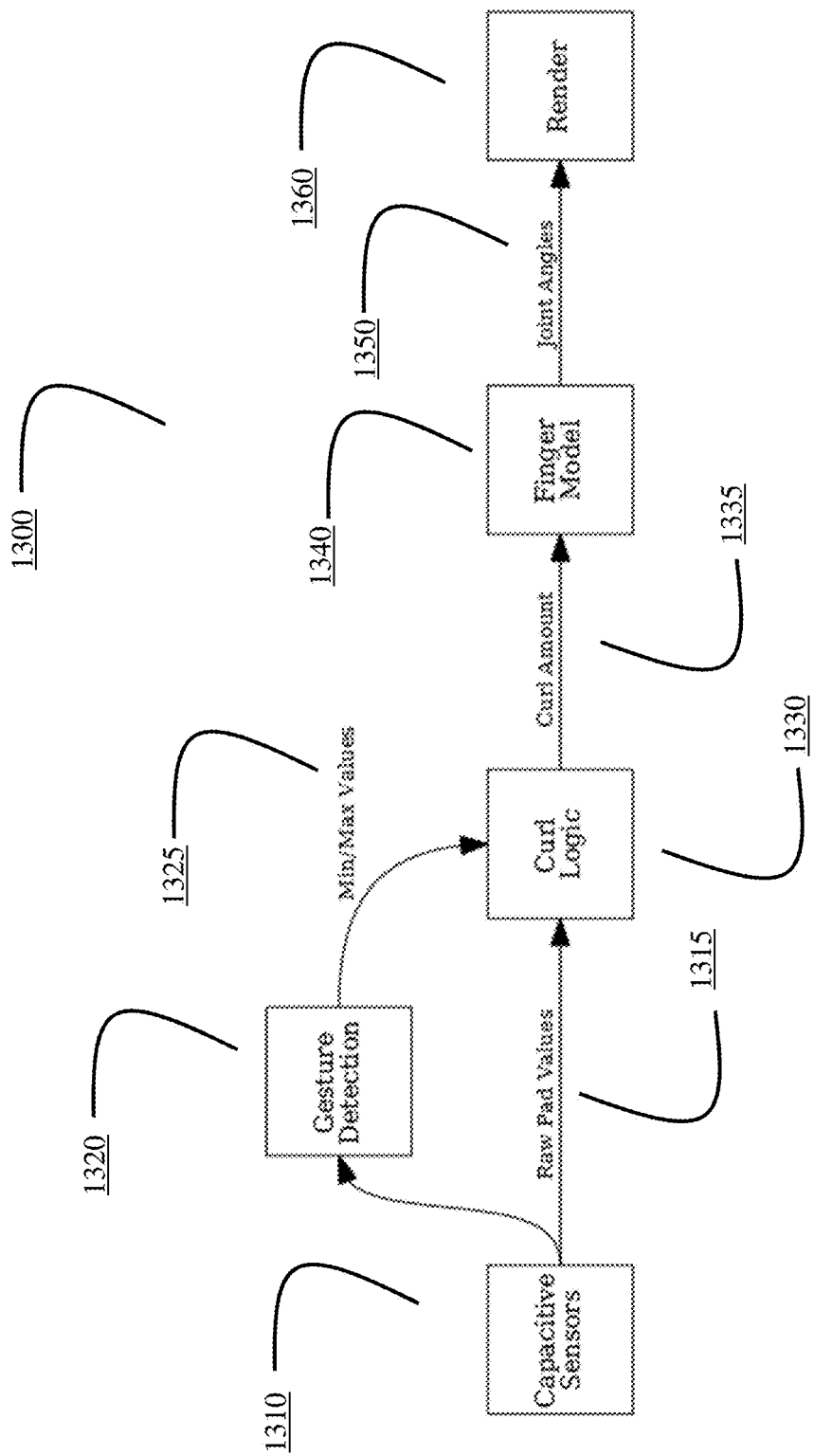
FIG. 13 depicts a block diagram of finger tracking techniques according to aspects of the present invention in certain embodiments.

FIG. 13 depicts a block diagram of finger tracking techniques according to aspects of the present invention in certain embodiments. As shown in FIG. 13, a finger tracking algorithm 1300 according to certain embodiments takes as its inputs the raw capacitive sensor values (i.e., the output of capacitive proximity sensing arrays 1310). Examples of such arrays have been shown in FIGS. 8-11C and described above. The finger tracking algorithm 1300 outputs a set of joint angles (1350), corresponding to each of a user's finger being tracked. On initialization, the raw sensor data (1315) is monitored for a specific hand gesture using gesture detection techniques (1320). Exemplary details of such initialization based on gesture detection with respect to particular embodiments are described later. Once detected, certain min/max values (1325) are calculated that allow the raw sensor data to be normalized for the user. The normalized data is then passed through curl logic (1330) which produces a linear estimate of gross finger curl (1335). This normalized data is then processed through a kinematic finger model (1340) to produce estimates for the individual finger joint angles being tracked (1350). The joint angles (1350) may then processed by render logic (1360) to deform a hand mesh which may rendered for display to the user (or to one or more other users). Additional details relating to the foregoing components of finger tracking techniques in accordance with aspects of the present invention are described throughout this document.

As has already been discussed, each finger being tracked has a corresponding linear array of capacitive sensors aligned roughly along the length of the finger in certain embodiments. When the hand is fully open, each sensor output will rest at some low value. As a finger closes around the controller, the analog value from each capacitive sensor increases in a roughly exponential manner. When the finger makes contact with the controller surface and cannot move any closer to the center, the sensor output stops at some maximum value. As shown in FIG. 13, the outputs of the capacitive proximity sensor array used in each embodiment (1315) may be routed to curl logic (1330) and to gesture detection logic (1320) for initialization purposes.

With respect to gesture detection logic (1320) according to certain embodiments, to perform a normalization step, the minimal and maximal values for each sensor must first be determined. This may be problematic in certain embodiments, because these values may be different for each sensor, may change from person to person, and may also change over the course of a play session as a user's skin capacitance changes (e.g., due to sweating) or as a user adjusts his or her grip.

To overcome this difficulty in certain embodiments, the raw capacitive values may be monitored, and identification of a known gesture may be attempted (e.g., opening the hand to grab something). By making assumptions about the finger poses at the beginning and end of the gesture, the minimal and maximal composite values may be estimated. In this way, recalibration may be performed continuously over the course of a play session.

In certain embodiments, the chosen reference gesture is the "ungrasp." That is, detection of when a user rapidly opens his or hand is attempted, either when the user reaches out for some virtual object in a game, or performs a deliberate calibration action. This choice is desirable in certain embodiments, since it is expected to occur early and often in a play session.

To detect this gesture, the history of the last N capacitive samples is stored. At every timestep, this history is then used to look for a large falling edge on a subset of sensors from every finger. If at any timestep a falling edge is detected for all sensors in these subsets, the gesture is said to be detected. When this gesture is detected, a separate routine is run on the sensor history for each pad to determine its minimal and maximal values. To prevent gesture detections from occurring too rapidly, a lockout period is enforced (currently set at 0.5 seconds) after every gesture detection event. To be robust against false positive gesture detections, a history (N equals five in certain embodiments) of the previous detected minimal and maximal values is stored, choosing only to use the median of the values in the curl logic.

Figure 14:
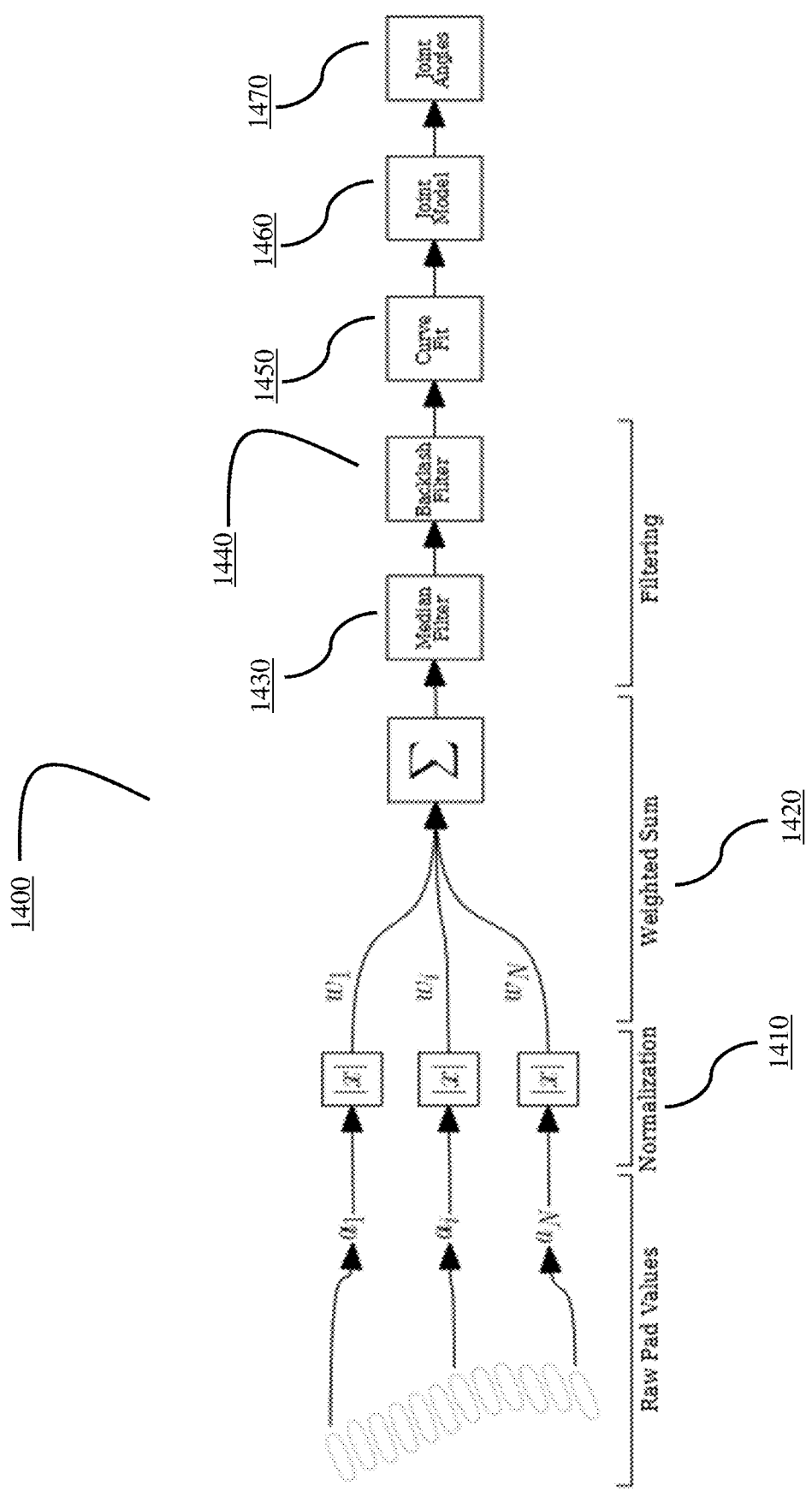
FIG. 14 depicts a block diagram of finger tracking techniques according to aspects of the present invention in certain embodiments.

FIG. 14 depicts a block diagram of finger tracking techniques (1400) according to aspects of the present invention in certain embodiments. As shown in FIG. 14, to estimate the curl amount for each finger, first the contribution of each sensor to the overall amount of finger curl is calculated by normalizing (using normalization logic 1410) the output of each sensor (i.e., $a_1 \ldots a_i \ldots a_N$) between the previously discussed minimal and maximal values, such that the normalized sensor output is zero when the hand is fully open (curl is zero) and one when the hand is fully closed (curl is one). It should be noted that the term "normalize" is used in the general sense here, and that the output is not restricted to the range [0,1]. That is, the output is allowed to exceed 1 when the user squeezes the controller tightly and falls below 0 when the user hyper-extends his or her fingers, depending on the requirements of each particular implementation.

Once the raw capacitance values have been normalized, a weighted sum (1420) is performed to produce the unfiltered finger curl amount. The weights ($w_i$) are chosen such that the sum of the N weights equals one, i.e.:

$$\sum_{i=1}^{N} w_i = 1$$

This unfiltered finger curl value is then passed first through a median filter (1430) and then a backlash filter (1440). The median filter (1430) helps to reject transient spikes, while the backlash filter (1440) helps to remove baseline sensor noise during periods of little or no finger motion.

The filter curl value is the processed through curve fit logic (1450) to produce the final finger curl amount, via joint model (1460) to generate a set of joint angles (1470). Depending on the particular requirements of each specific implementation, a simple exponential fit may be sufficient, although a more elaborate curve may be used.

The gesture detection method described previously with reference to certain embodiments (e.g., for initialization) facilitates determining the capacitive sensor values when the hand is fully open (curl equals zero) and fully closed (curl equals one). However, this method does not provide any details about the intermediate points. The curl logic produces a roughly linearized curl value for the entire finger, but some additional model of each finger is required to produce angles for each joint on the finger.

Figure 15A:
FIGS. 15A and 15B depict kinematic diagrams showing joint angles with the finger being tracked fully extended (15A) and fully curled (15B) according to aspects of the present invention.
Figure 15B:
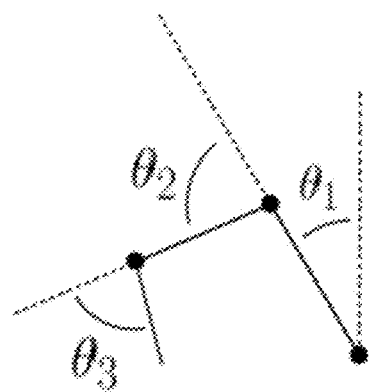

Corresponding to a joint model (e.g., item 1460 as shown in FIG. 14), FIGS. 15A and 15B depict kinematic diagrams showing joint angles with the finger fully extended (FIG. 15A) and fully curled (FIG. 15B) according to aspects of the present invention. As shown in FIGS. 15A and 15B, in certain embodiments, a simple proportional model may be assumed, where the joint angles are related to each other through a single scale factor, i.e.:

$\theta_1 = k_1 C$ $\theta_2 = k_2 C$ $\theta_3 = k_3 C$

The scale factors are determined experimentally, such that, for a given hand and object mesh, the finger is fully wrapped around the object when the curl is one. In practice, this is achieved by creating an animation containing one keyframe when the finger is fully extended, another when it is fully wrapped around the object, and using the curl value to interpolate between them.

In other embodiments, the relationship between the joint angles may be more complex, and more detailed finger models may be implemented, depending on the requirements of each particular implementation.

In certain embodiments, palm-side pads that do not change during a grasp-ungrasp event should be weighted to zero. Also, negatively weighted pads in certain embodiments can help eliminate crosstalk between fingers. However, palm-side pads with low signal range can cause noise.

Figure 16:
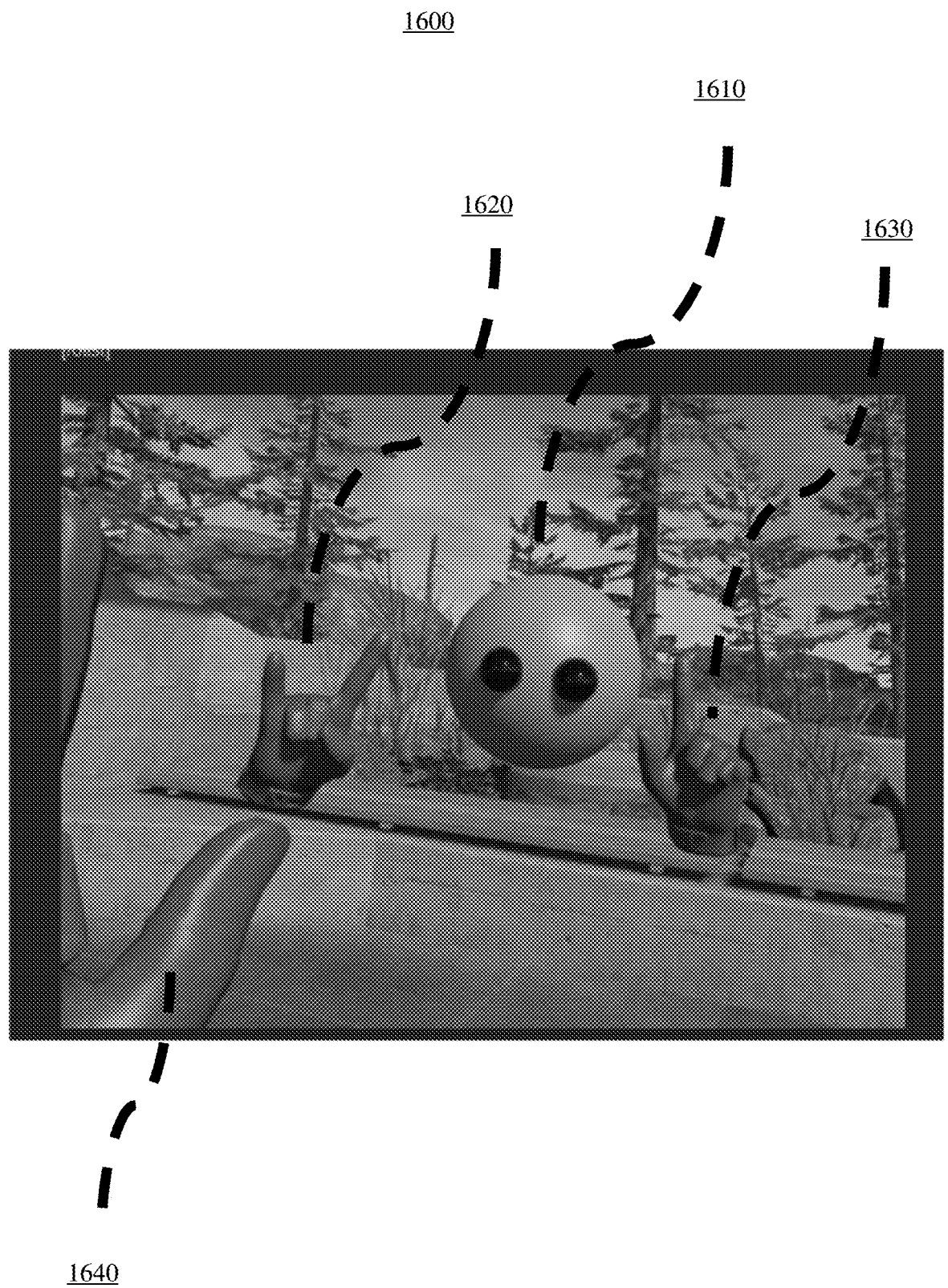
FIG. 16 depicts an exemplary virtual reality display, illustrating how users are able to show their articulated fingers in a virtual reality environment, either as images projected to themselves or to other users in a multiuser environment, according to aspects of the present invention.

FIG. 16 depicts an exemplary virtual reality display, illustrating how users are able to show their articulated fingers in a virtual reality environment, either as images projected to themselves or to other users in a multiuser environment, according to aspects of the present invention. As shown in FIG. 16, a virtual reality display (1600) being viewed by one user may include a representation of the head of another user (1610), as well as virtual representations of the left (1630) and right (1620) hands (and corresponding fingers) of that user. By implementing finger tracking techniques according to aspects of the present invention, the user viewing this scene (1600) receive visual information corresponding to the position and orientation of the other user's fingers (and/or hand gestures). Specifically, the virtual representation of the left hand (1630) of the user being viewed appears to be indicating a pointing gesture, with the index finger extended, while the middle, ring, and pinky fingers are fully curled. In contrast, the virtual representation of the right hand (1620) of the user being viewed appears to be indicating a "rock on" gesture, with the index finger and pinky fingers extended, while the middle and ring fingers are fully curled, and the thumb is clasped against the middle finger.

In addition, still referring to FIG. 16, the user viewing the scene (1600) may receive visual representations corresponding to his or her own hand gestures by implementing finger tracking techniques in accordance with the present invention. For example, a portion of the left hand (1640) of the user viewing the scene (1600) appears in the scene with the thumb and index fingers extended. The other portions of the user's left hand are not shown in the exemplary scene (1600) because the user has moved his or her left hand out of the image frame being rendered at the particular point in time represented in the scene (1600).

Figure 17:
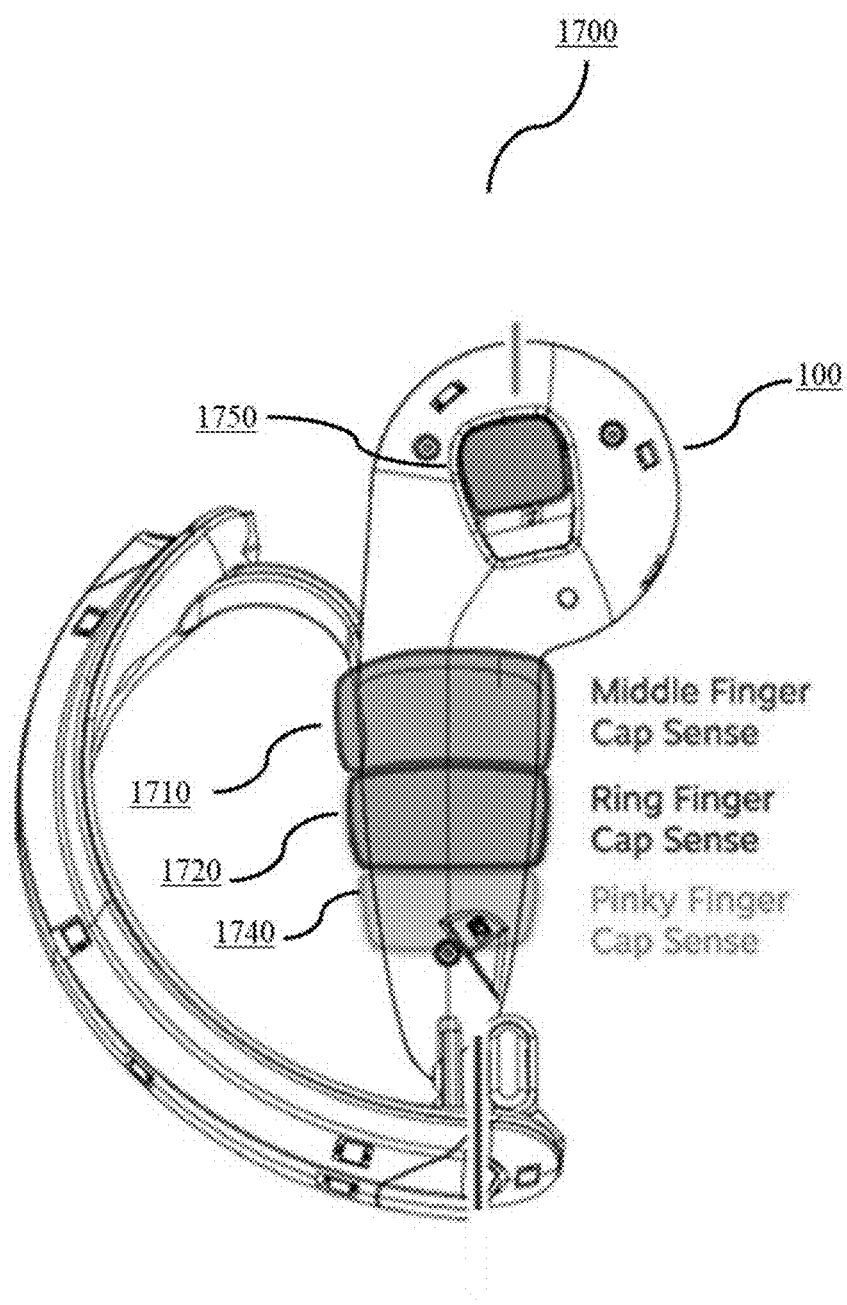
FIG. 17 depicts hand-held control device capacitance sense capabilities according to aspects of the present invention in certain embodiments, depicting four capacitance sense zones, i.e., index finger zone, middle finger zone, ring finger zone, and pinky finger zone.

FIG. 17 depicts capacitance sense capabilities/mappings (1700) according to aspects of the present invention in certain embodiments, depicting four capacitance sense zones, i.e., index finger sensing zone (1750), middle finger sensing zone (1710), ring finger sensing zone (1720), and pinky finger sensing zone (1740), within hand-held control device (100). Depending on the requirements of each particular implementation, capacitance sense zones may be incorporated near the area where the user's thumb is located (e.g., near the top of controller 100 as shown in FIG. 17), to facilitate thumb-activation of buttons and/or trackpad functionality based on tracking the position of the user's thumb. This is discussed in more detail later in this document, for example with reference to FIG. 18. In certain embodiments, various variables/values may be generated by finger tracking techniques according to aspects of the present invention, each corresponding to the output of the finger tracking algorithm for a given finger of a user. As skilled artisans will recognize, these variables/values may be transmitted to other components of a VR system, for example, to generate displays with articulated user finger position information, such as those depicted in FIG. 16.

In addition, in certain embodiments, one or more force-sensing resistors (FSRs) may be incorporated into the outer surface at various areas of the controller (100), such as near the top of the controller (under where the user's thumb would normally be located), and/or under the areas where the user's middle, ring, and/or pinky fingers would normally contact the body of the controller while the user is holding the handle portion of the controller body. Data from any such FSRs or other suitable sensors may be incorporated into finger tracking techniques according to aspects of the present invention in certain embodiments, to improve the accuracy of the output of the finger trackers. Similarly, for example using sensor fusion techniques known to skilled artisans, any other available information regarding the location of any of the user's fingers relative to the handle portion of the controller may also be incorporated into the finger tracking techniques according to aspects of the present invention to improve accuracy and/or other desired tracking performance parameters.

Figure 18:
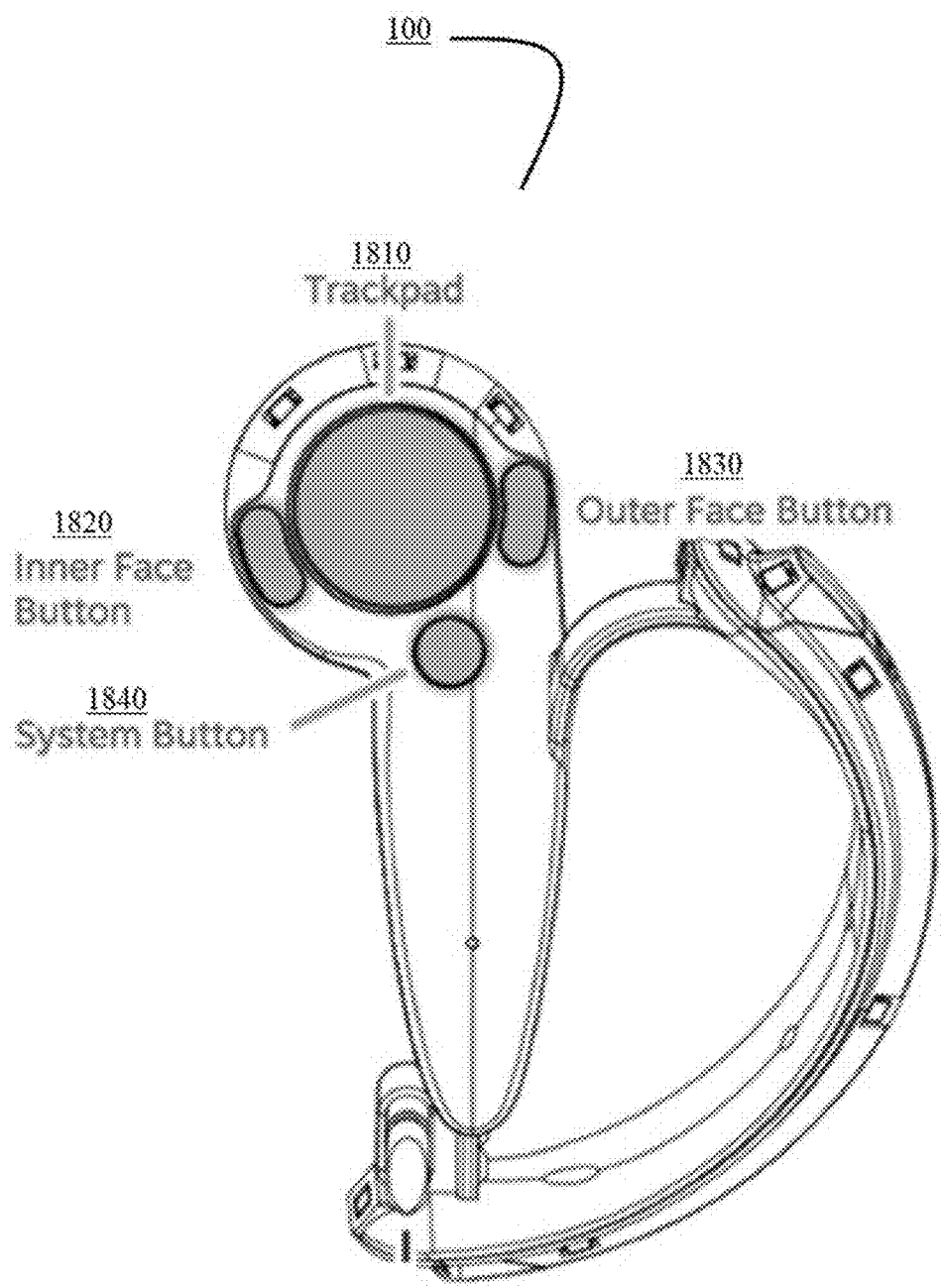
FIG. 18 depicts a controller according to aspects of the present invention in certain embodiments, illustrating four zones/buttons that may be controlled and/or activated by a user's thumb, i.e., a trackpad zone, an inner button, an outer button, and a system button.

FIG. 18 depicts a controller (100) according to aspects of the present invention in certain embodiments that implement finger tracking techniques as described herein, illustrating four zones/buttons that may be controlled and/or activated by a user's thumb, i.e., a trackpad zone (1810), an inner button (1820), an outer button (1830), and a system button (1840). Depending on the particular requirements of each implementation, the buttons (1820, 1830, 1840) may be activated by physical depression of the appropriate zone or by detecting the tip of the user's thumb near the button being activated, while the trackpad zone (1810) may be controlled by detecting the position of the tip of the user's thumb relative to a plurality of sub-zones within the trackpad zone (1810).

The invention is described with reference to specific exemplary embodiments herein, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A system comprising:
   a handheld controller comprising:
      a controller body having a handle; and
      a proximity sensor coupled to the handle and responsive to a proximity of a finger of a user to the handle;
   one or more processors; and
   one or more computer-readable media storing computer-executable instructions that, when executed by the one or more processors, cause the one or more processors to perform operations comprising:
      receiving, from the proximity sensor, proximity data representing the proximity of the finger of the user to the handle;
      determining an unfiltered finger curl value based at least in part on the proximity data;
      passing the unfiltered finger curl value through one or more filters to obtain a filtered finger curl value; and
      determining an estimated joint angle of the finger based at least in part on the filtered finger curl value.

2. The system of claim 1, the operations further comprising:
   processing the estimated joint angle to deform a hand mesh that is rendered for display.

3. The system of claim 1, wherein the determining of the unfiltered finger curl value based at least in part on the proximity data comprises:
   calculating a set of values based at least in part on the proximity data;

generating, based at least in part on the set of values, a set of normalized finger detection data; and processing the set of normalized finger detection data to determine the unfiltered finger curl value.

4. The system of claim 1, wherein the handheld controller is for use in conjunction with a virtual reality system.

5. The system of claim 1, wherein the handheld controller includes a tracking arc that is fixed to the controller body.

6. The system of claim 5, wherein the tracking arc includes a first plurality of tracking sensors, the first plurality of tracking sensors being responsive to electromagnetic radiation emitted by an electronic device of the system.

7. The system of claim 1, wherein the handheld controller includes a hand retainer configured to physically bias a palm of the user against an outside surface of the handle.

8. The system of claim 1, wherein the controller body further comprises a distal head that extends from the handle, the distal head including:

a distal end, and at least one thumb-operated control disposed between the handle and the distal end.

9. The system of claim 1, wherein the proximity sensor comprises a plurality of capacitive sensors embedded under an outer surface of the handle, the outer surface comprising an electrically insulative material.

10. A method comprising:

receiving first data from a proximity sensor that represents a proximity of a finger of a user relative to a handle of a controller;

determining an unfiltered finger curl value based at least in part on the first data;

passing the unfiltered finger curl value through one or more filters to obtain a filtered finger curl value; and determining an estimate of a joint angle of the finger based at least in part on the filtered finger curl value.

11. The method according to claim 10, further comprising:

generating a hand mesh based at least in part on the estimate of the joint angle of the finger; and rendering the hand mesh for display.

12. The method according to claim 10, further comprising:

receiving second data from the proximity sensor prior to the receiving of the first data;

determining that the second data corresponds to a predetermined hand gesture of the user; and initializing finger tracking in response to the determining that the second data corresponds to the predetermined hand gesture.

13. The method according to claim 12, wherein the predetermined hand gesture comprises an ungrasp gesture.

14. The system of claim 1, wherein the proximity sensor is incorporated into one or more flexible printed circuits, and wherein each of the one or more flexible printed circuits is attached to an inner surface of the handle.

15. The system of claim 1, wherein the proximity sensor comprises an array comprising a plurality of capacitive sensors.

16. The method according to claim 10, further comprising:

calculating a plurality of values based at least in part on the first data to facilitate normalization of the proximity sensor with respect to the user; and generating a set of normalized finger detection data based at least in part on the plurality of values.

17. The method according to claim 16, further comprising:

processing the set of normalized finger detection data through a set of curl logic to produce an estimate of finger curl with respect to the user; and calculating the estimate of the joint angle based at least in part on the estimate of the finger curl.

18. The method according to claim 17, wherein the estimate of the joint angle is a linear estimate.

19. The system of claim 1, wherein the estimated joint angle of the finger comprises a first estimated joint angle of the finger, the operations further comprising:

determining a joint model associated with the finger of the user; and determining, based at least in part on the joint model and the first estimated joint angle, a second estimated joint angle of the finger.

20. The system of claim 1, wherein the finger of the user comprises a first finger of the user, the handheld controller further comprising:

an additional proximity sensor coupled to the handle and responsive to a proximity of a second finger of the user to the handle;

and wherein the operations further comprise:

receiving, from the additional proximity sensor, additional proximity data representing the proximity of the second finger of the user to the handle, the additional proximity data being used to determine the estimated joint angle of the first finger.

21. The system of claim 1, wherein the finger of the user comprises a first finger of the user, the handheld controller further comprising:

a force-sensing resistor (FSR) coupled to the handle and responsive to at least one of the first finger or a second finger of the user grasping the handle; and wherein the operations further comprise:

receiving, from the FSR, force data representing a force of the at least one of the first finger or the second finger of the user grasping the handle, the force data being used to determine the estimated joint angle of the first finger.

22. The method according to claim 10, wherein the finger of the user comprises a first finger of the user, the method further comprising:

receiving second data from an additional proximity sensor that represents a proximity of a second finger of the user relative to the handle, wherein the second data is used to determine the estimate of the joint angle of the first finger.

23. The method according to claim 10, wherein the finger of the user comprises a first finger of the user, the method further comprising:

receiving second data from a force-sensing resistor (FSR) that represents a force of at least one of the first finger or a second finger of the user grasping the handle, wherein the second data is used to determine the estimate of the joint angle of the first finger.

24. A device comprising:

one or more processors; and one or more computer-readable media storing computer-executable instructions that, when executed by the one or more processors, cause the one or more processors to perform operations comprising:

receiving proximity data generated by a proximity sensor, the proximity data representing a proximity of a finger of a user to a handle of a controller;

determining an unfiltered finger curl value based at least in part on the proximity data;

passing the unfiltered finger curl value through one or more filters to obtain a filtered finger curl value; and determining an estimated joint angle of the finger based at least in part on the filtered finger curl value.

25. The device of claim 24, the operations further comprising:

receiving additional proximity data generated by an additional proximity sensor, the additional proximity data representing a proximity of a second finger of the user relative to the handle of the controller, and wherein determining the estimated joint angle of the finger is further based at least in part on the additional proximity data.

26. The device of claim 24, the operations further comprising:

receiving force data generated by a force-sensing resistor (FSR), the force data representing a force of at least one of the finger or a second finger of the user grasping the handle, and wherein determining the estimated joint angle of the finger is further based at least in part on the force data.

27. The system of claim 1, wherein the passing of the unfiltered finger curl value through the one or more filters comprises passing the unfiltered finger curl value through:

a median filter to reject transient spikes; and a backlash filter to remove baseline sensor noise.

* * * * *